(12) United States Patent
Rayle

(10) Patent No.: US 12,723,709 B2
(45) Date of Patent: Sep. 1, 2026

(54) MULTI-PART CLIP DEVICE FOR FRAMING STRUCTURES AND SCREEN ENCLOSURES

(71) Applicant: Keith E. Rayle, Daytona Beach, FL (US)

(72) Inventor: Keith E. Rayle, Daytona Beach, FL (US)

(*) Notice: Subject to any disclaimer, the term of this patent is extended or adjusted under 35 U.S.C. 154(b) by 0 days.

(21) Appl. No.: 19/307,224

(22) Filed: Aug. 22, 2025

(65) Prior Publication Data

US 2026/0202004 A1 Jul. 16, 2026

Related U.S. Application Data

(63) Continuation-in-part of application No. 19/022,680, filed on Jan. 15, 2025.

(51) Int. Cl.
*F16M 13/02* (2006.01)
*F16M 11/04* (2006.01)

(52) U.S. Cl.
CPC ............ *F16M 13/02* (2013.01); *F16M 11/04* (2013.01)

(58) Field of Classification Search
CPC ........ B25B 27/146; B25G 1/04; G03B 21/56; F16M 13/04; F16M 11/04; F16M 13/02; E06B 9/24
See application file for complete search history.

(56) References Cited

U.S. PATENT DOCUMENTS

2017/0129766 A1* 5/2017 Fukuzawa ................ B68G 7/05

* cited by examiner

*Primary Examiner* — Lee A Holly
(74) *Attorney, Agent, or Firm* — Law Office of John R. Nelson, PA; John R. Nelson, Esq.

(57) ABSTRACT

The invention relates to a multi-part clip device and installation tool system for securely mounting objects within aluminum-framed screen enclosures without requiring structural modification. The clip device comprises a component body, retention braces, spring tensioner curves, a slide top limiter, and an object retainer assembly configured for reversible engagement with interior framing channels. The installation tool includes an angled tool head, clip retainer, and retention channel designed to guide and seat the clip device at varied heights and angles, including hard-to-reach locations. The system enables non-invasive, tool-assisted attachment of decorative or functional items—such as lights, plants, curtains, or fans—while maintaining structural integrity and aesthetic appeal of the enclosure.

17 Claims, 30 Drawing Sheets

MULTI-PART CLIP DEVICE FOR FRAMING STRUCTURES AND SCREEN ENCLOSURES

FIELD OF INVENTION

The present disclosure relates to multi-part clip devices for use in framing structures such as screen enclosures. More specifically, it relates to clip devices with spring-tensioned and interlocking components, and optionally associated installation tools, configured to retain objects within extruded aluminum framing channels without requiring permanent structural modifications.

CROSS-REFERENCE TO RELATED APPLICATIONS

This application is a Continuation in Part of U.S. patent application Ser. No. 19/022,680, filed Jan. 15, 2025, the entire contents of which are hereby incorporated by reference.

BACKGROUND

The following discussion is not to be deemed admitted prior art, but rather provides related background information to illustrate conventional systems and highlight the need for improved solutions for hanging objects within screen enclosures using clip devices.

Screen enclosures, as used herein, may include but are not limited to patio enclosures, pool enclosures, lanai enclosures, sunrooms, screened porches, and mosquito net structures.

Aluminum framing, as used herein, refers to structural elements such as extruded aluminum profiles, posts, beams, rails, channels, and other aluminum framing supports.

Hanging objects may include decorative lights, plants, wind chimes, fans, speakers, curtains, and ornaments, among others.

Extension tools may include extension poles, telescoping handles, clip applicators, mounting devices, and installation aids designed to assist in positioning the multi-part clip devices.

This disclosure describes a multi-part clip device system adapted for hanging objects within screen enclosures. While decorative lights and pool enclosures are used as illustrative examples, the system is adaptable to a broad range of objects and framing configurations. In various embodiments, the multi-part clip device comprises interlocking or cooperative structural components that improve strength, alignment, and attachment flexibility.

Screen enclosures are commonly used in residential settings to enclose patios and pools, providing protection from insects and debris while allowing outdoor enjoyment. These enclosures typically consist of extruded aluminum frames that support mesh screen panels. Homeowners often wish to hang decorative or functional items from the frame to enhance their living spaces.

Conventional methods for hanging objects within screen enclosures present several limitations. Drilling into aluminum framing compromises structural integrity, may void warranties, and is often discouraged by installers and manufacturers.

Adhesive-based hooks or fasteners are commonly used but lack durability under outdoor conditions. Temperature changes and humidity degrade adhesives, and removal often damages the surface finish of the aluminum.

Clamp-based solutions exist but tend to be bulky, aesthetically obtrusive, or difficult to install-especially at height. Furthermore, most rely on monolithic one-piece designs that limit adjustability, alignment precision, and compatibility with different framing sizes.

These shortcomings highlight the need for a user-friendly, non-permanent, and versatile mounting solution. Ideal solutions should avoid the need for drilling, provide secure retention under various loads and conditions, and be easy to install-preferably from ground level using optional tools.

Accordingly, there remains a need for a multi-part clip device system capable of securely hanging objects within screen enclosures. Embodiments described herein incorporate multiple cooperating or interlocking components to increase strength, enable varied orientations, improve installation precision, and ensure compatibility with a range of aluminum framing profiles.

BRIEF SUMMARY OF THE INVENTION

The present invention provides a modular clip device with interlocking components and spring-biased tensioners that mechanically engage aluminum framing channels to support hanging objects within patio and pool screen enclosures, without adhesives, drilling, or structural alteration.

Various embodiments include multi-component clip systems with defined mechanical interfaces—such as insertable posts and retention slots—designed for direct engagement with standard aluminum framing channels used in screen enclosures.

The invention addresses the technical challenge of non-invasively mounting objects within aluminum-framed screen enclosures by using modular clip components that secure through friction and structural tension. Certain embodiments enable tool-assisted installation at varied heights and angles via mechanical coupling with an angled extension tool.

The disclosed multi-part clip device improves upon conventional solutions by incorporating spring-tensioned structural curves, retention braces, and a modular object retainer that conform to varied aluminum channel geometries. These mechanical features provide secure load-bearing retention across environmental conditions without adhesives, fasteners, or permanent alteration.

BRIEF DESCRIPTION OF THE DRAWINGS

A device and system to hang objects within screen enclosures is illustrated by way of example, and not by way of limitation, in the figures of the accompanying drawings.

While aspects of the device and system will be described with reference to the details shown in the drawings (and some embodiments not shown in the drawings), these details are not intended to limit the scope of the invention.

This Continuation-in-Part (CIP) application includes updated and additional drawings that replace and expand upon the original figures in parent application U.S. patent application Ser. No. 19/022,680.

Specifically:

- Original FIGS. 1-5 are hereby replaced with updated FIGS. 1A-5C, which provide revised and more detailed illustrations of the component body and its orientation.
- Original FIGS. 6-10 are retained but modified to reflect the multi-part nature of the device.
- New FIGS. 11A-17A, and 18-20 are added to illustrate additional components, exploded views, alternate orientations of the object retainer, and in-use applications of the multi-part clip device.

These updated and additional drawings better reflect the structural and functional aspects of the multi-part clip device disclosed herein and support the additional subject matter introduced in this CIP application.

Figure 1A:
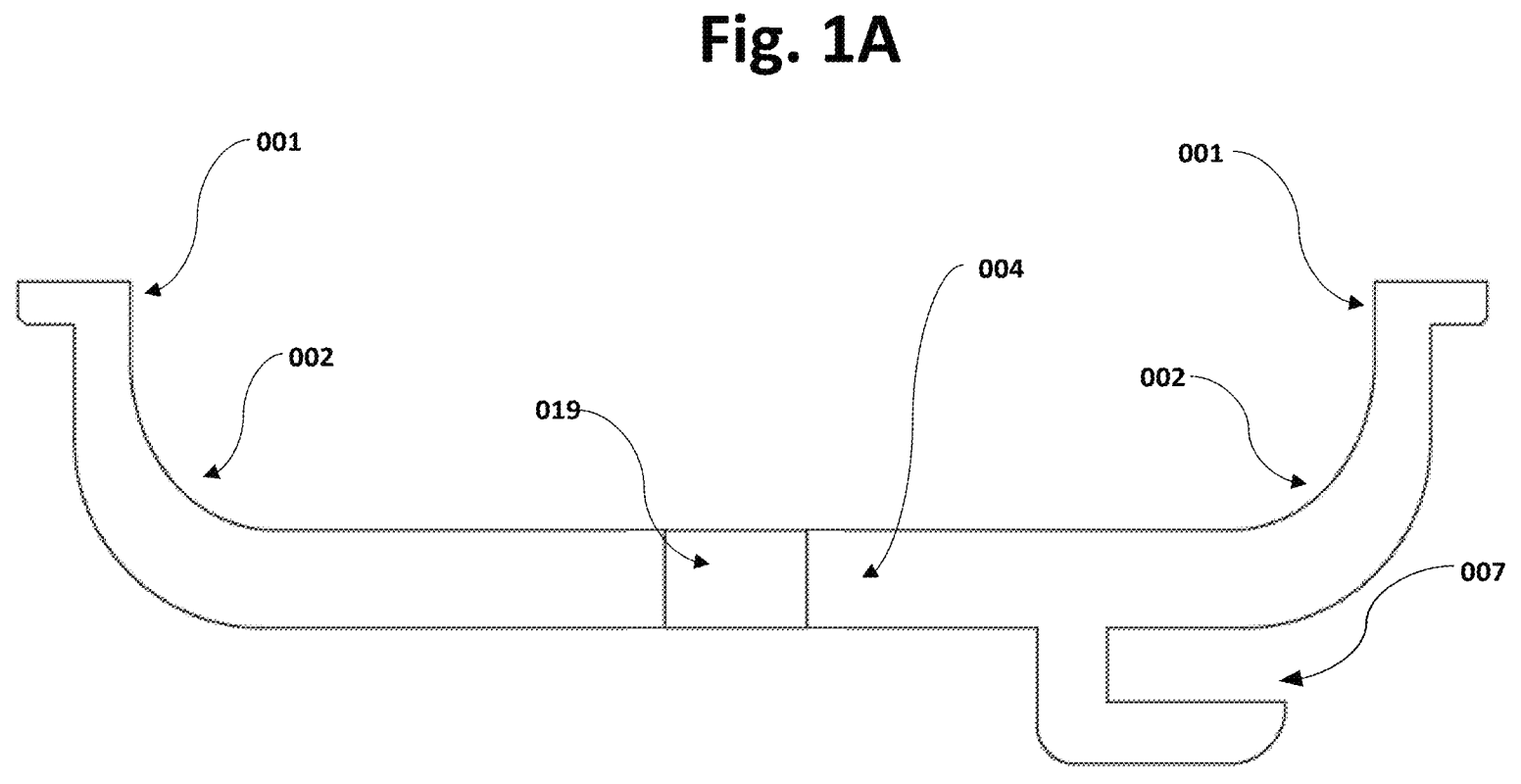

FIG. 1A is a side view of a multi-part clip device showing the component body.

Figure 2A:
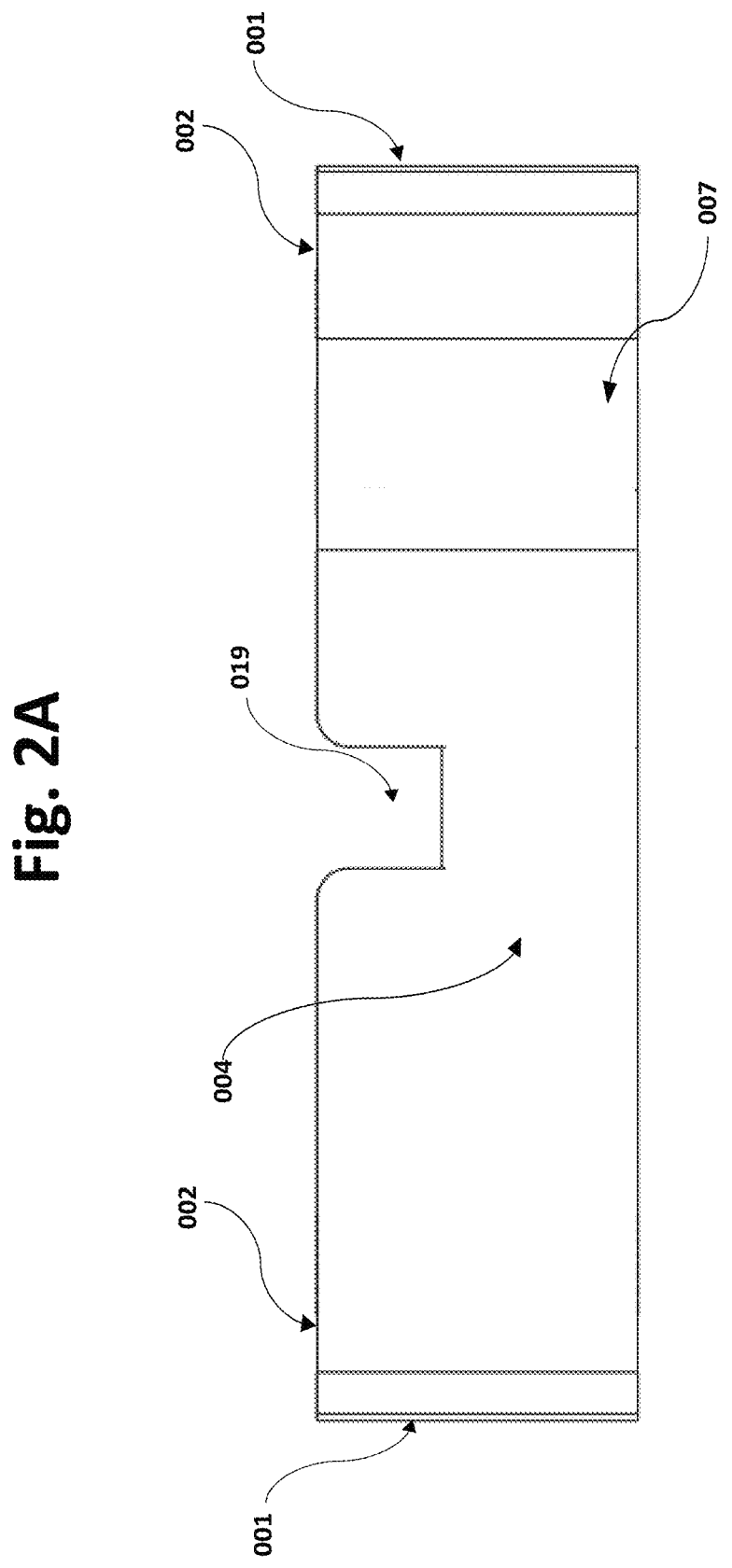

FIG. 2A is a bottom-up view of the multi-part clip device.

Figure 3A:
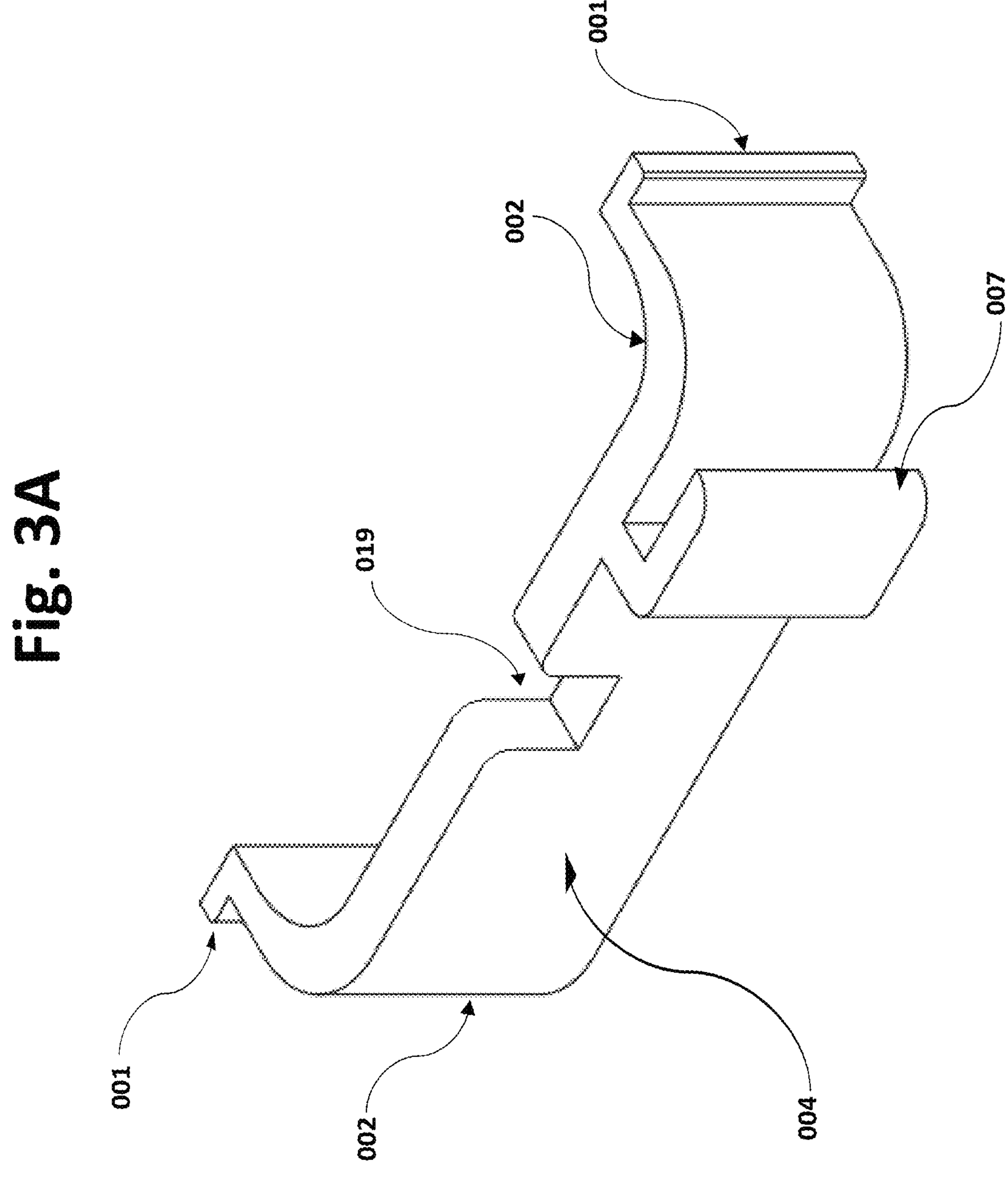

FIG. 3A is a perspective view showing the three-dimensional arrangement of components of the component body.

Figure 4A:
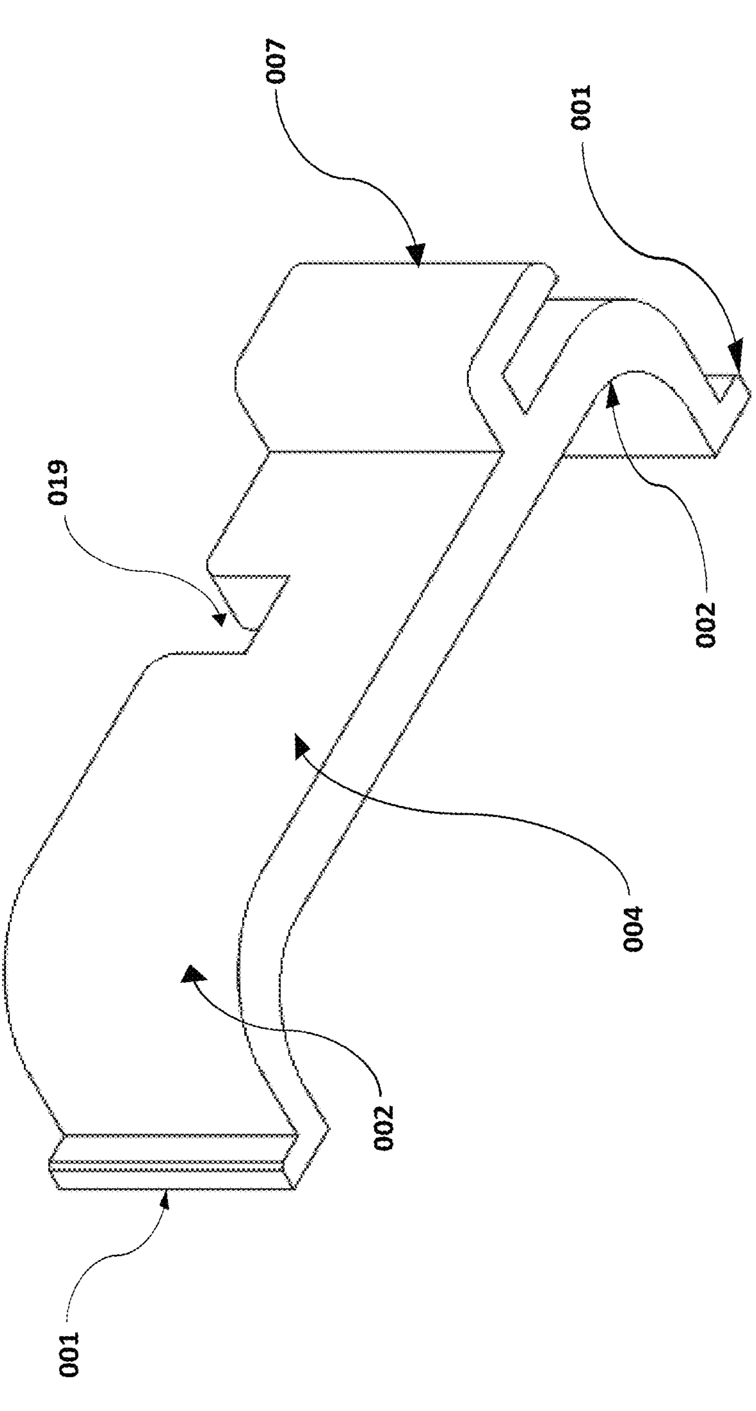

FIG. 4A is another perspective view showing the three-dimensional arrangement of components of the component body.

Figure 5A:
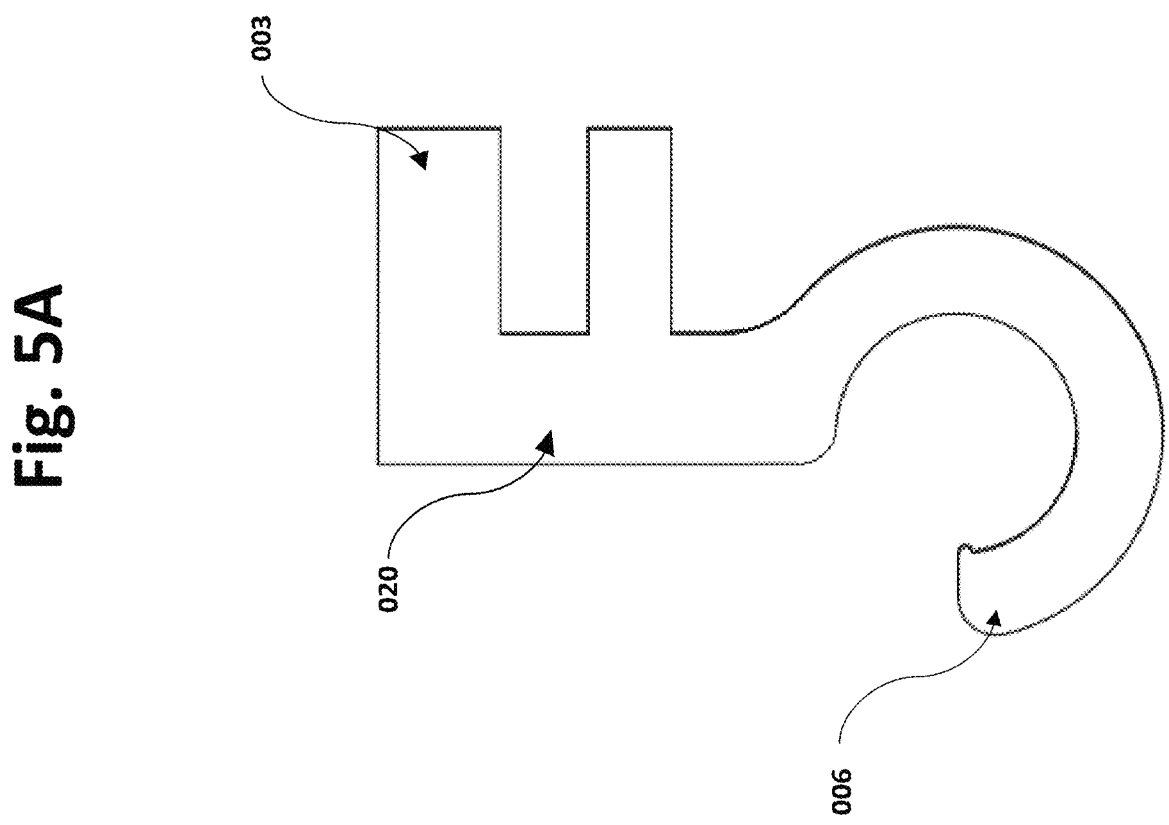

FIG. 5A is a side view of the multi-part clip device showing the insertable clip retention post.

Figure 5B:
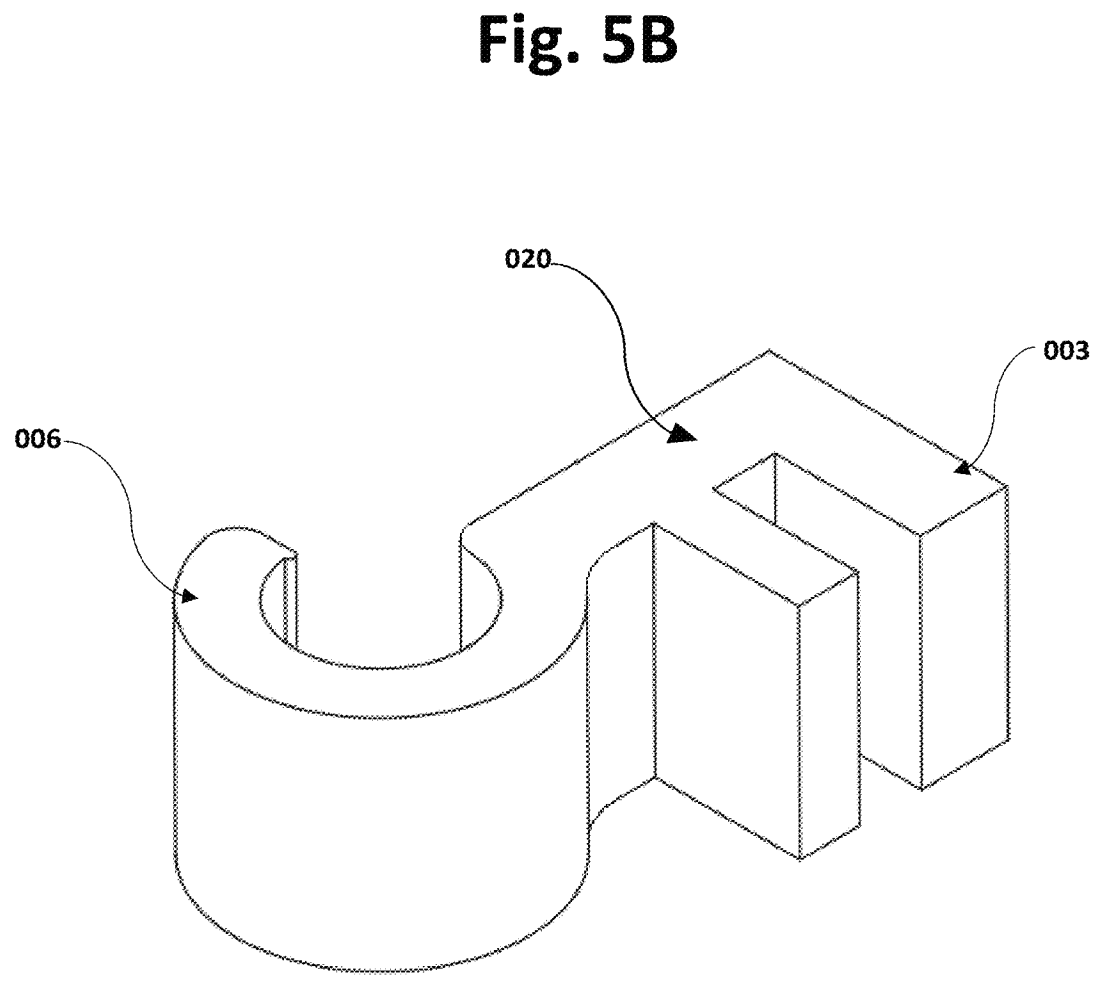

FIG. 5B is a perspective view of the multi-part clip device showing the insertable clip retention post.

Figure 5C:
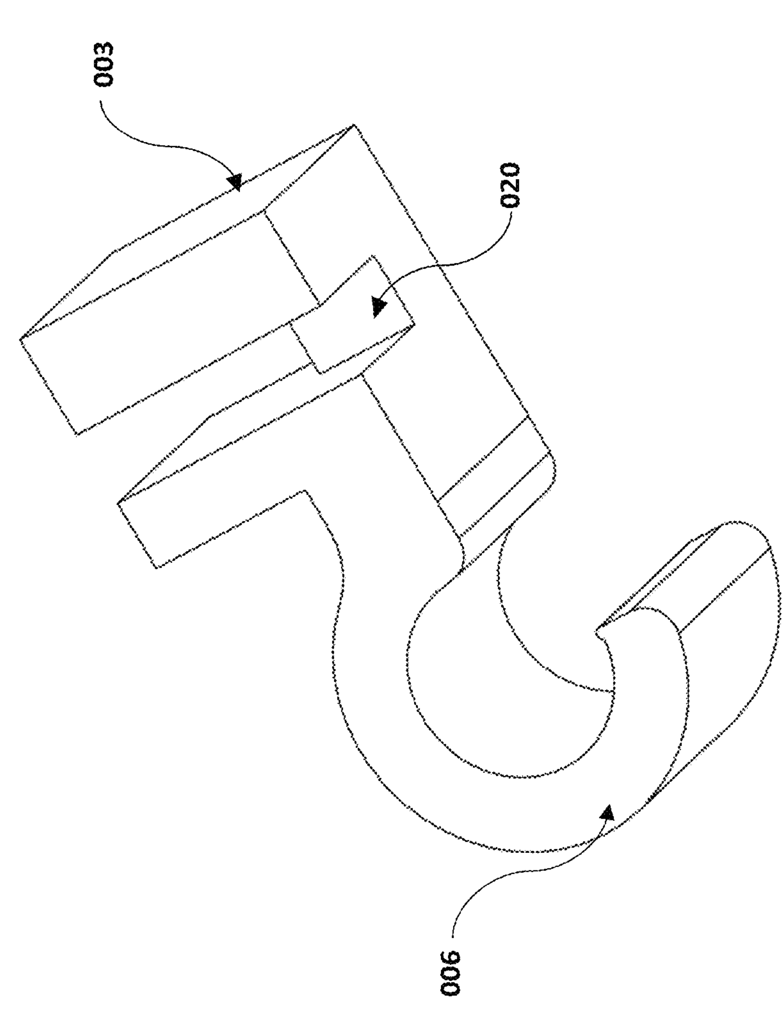

FIG. 5C is a perspective view showing the insertable clip retention post of FIG. 5B, rotated 180 degrees.

Figure 6:
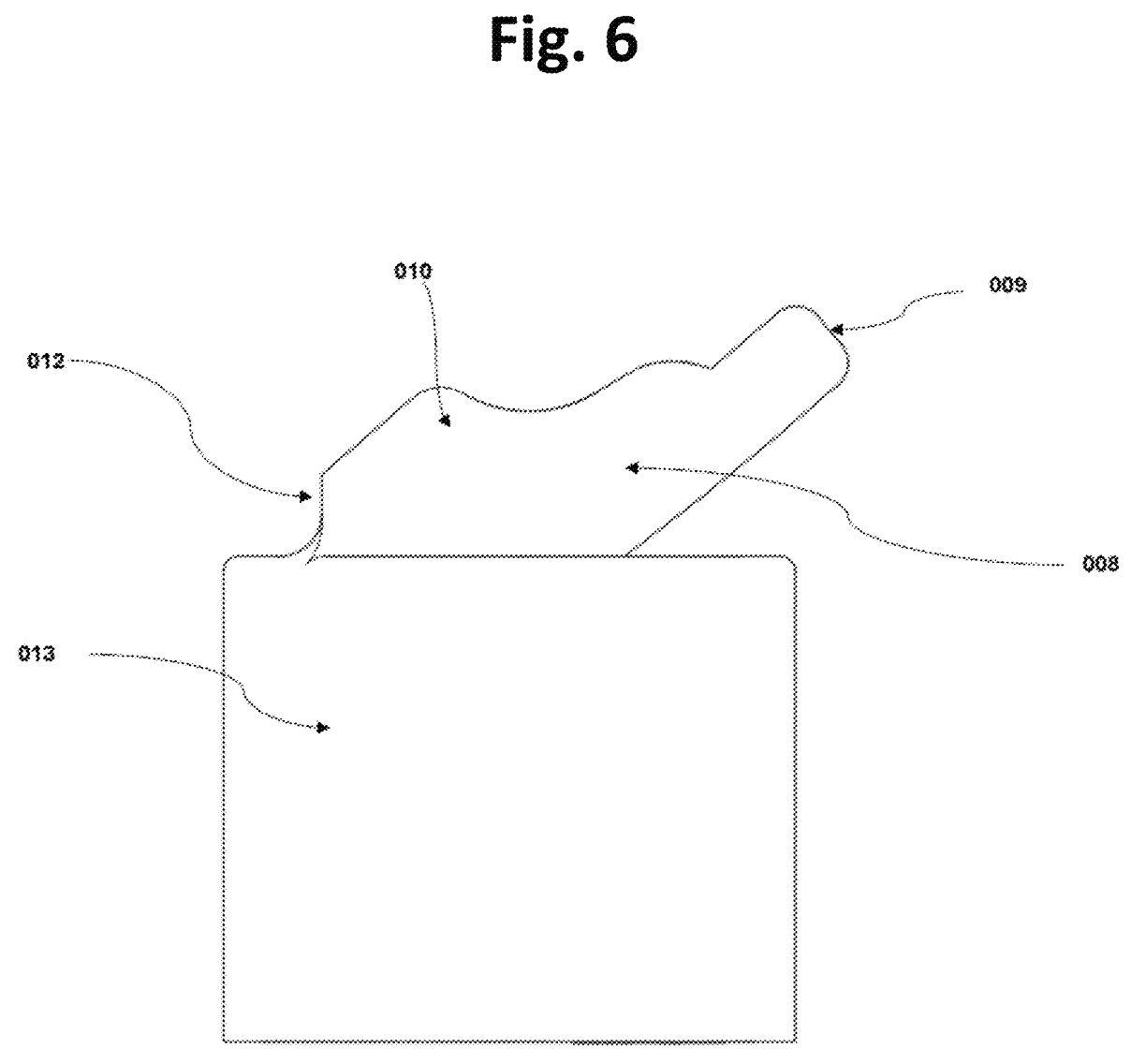

FIG. 6 is an orthogonal side view of an installation tool for mounting clip devices.

Figure 7:
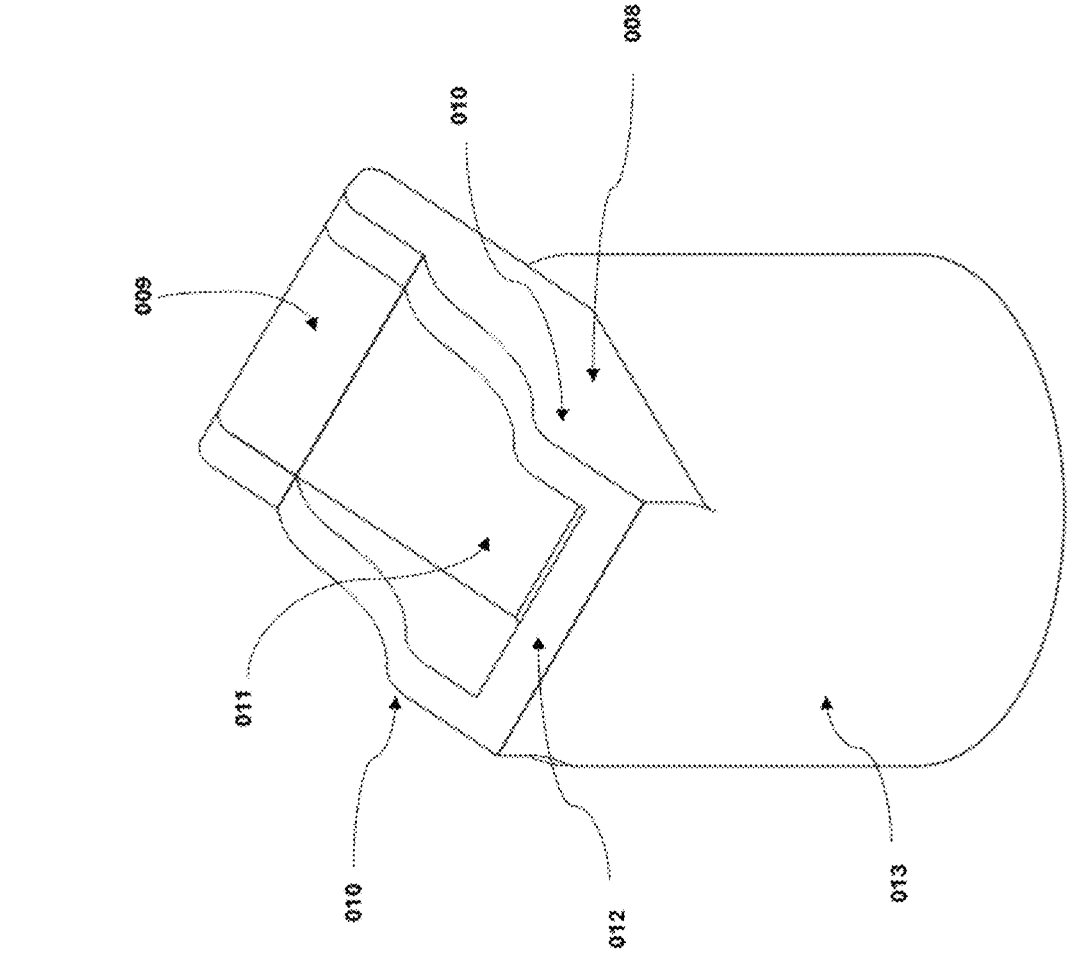

FIG. 7 is an isometric view of the installation tool for mounting clip devices.

Figure 8:
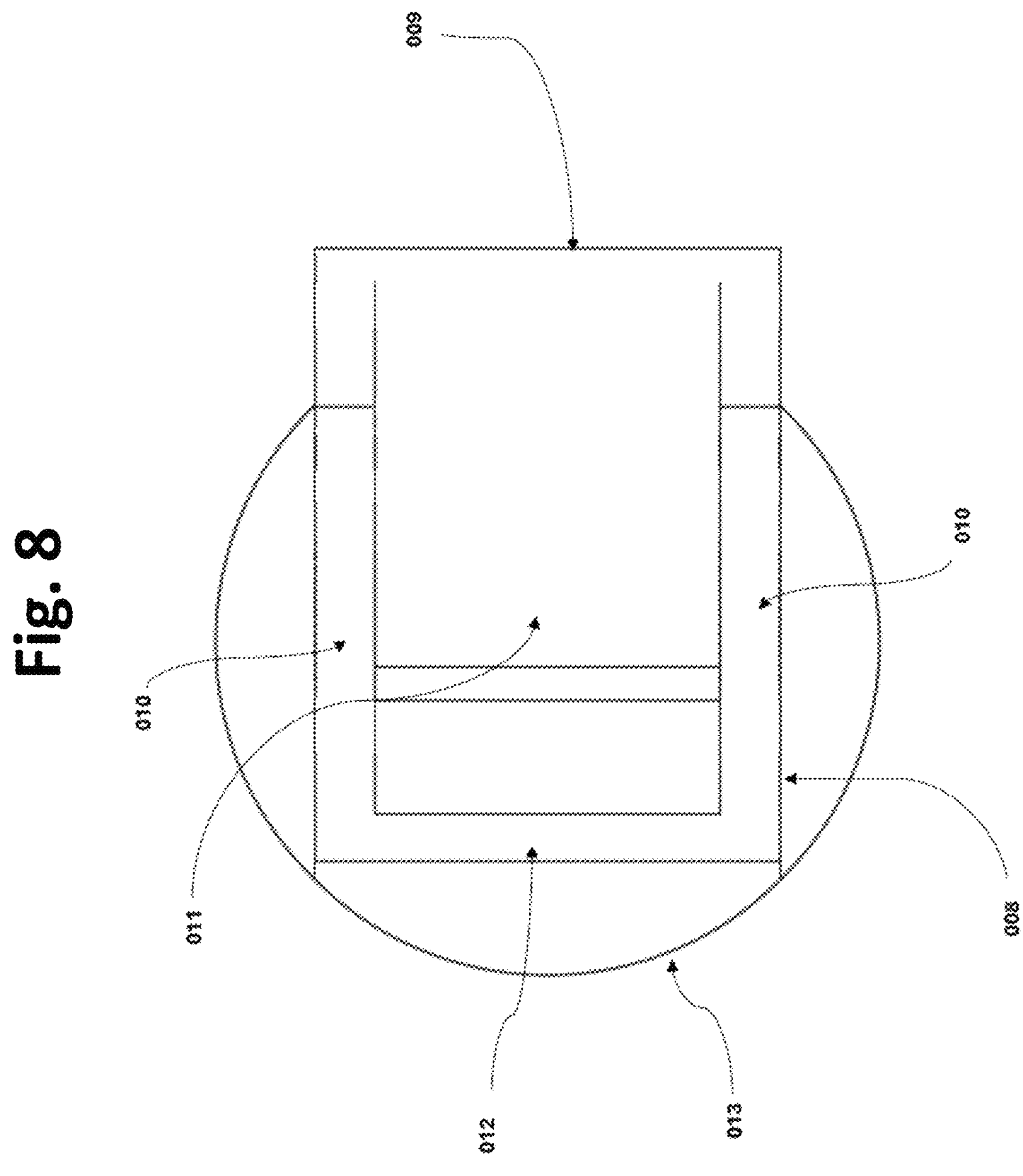

FIG. 8 is a top orthogonal view of the installation tool assembly.

Figure 9:
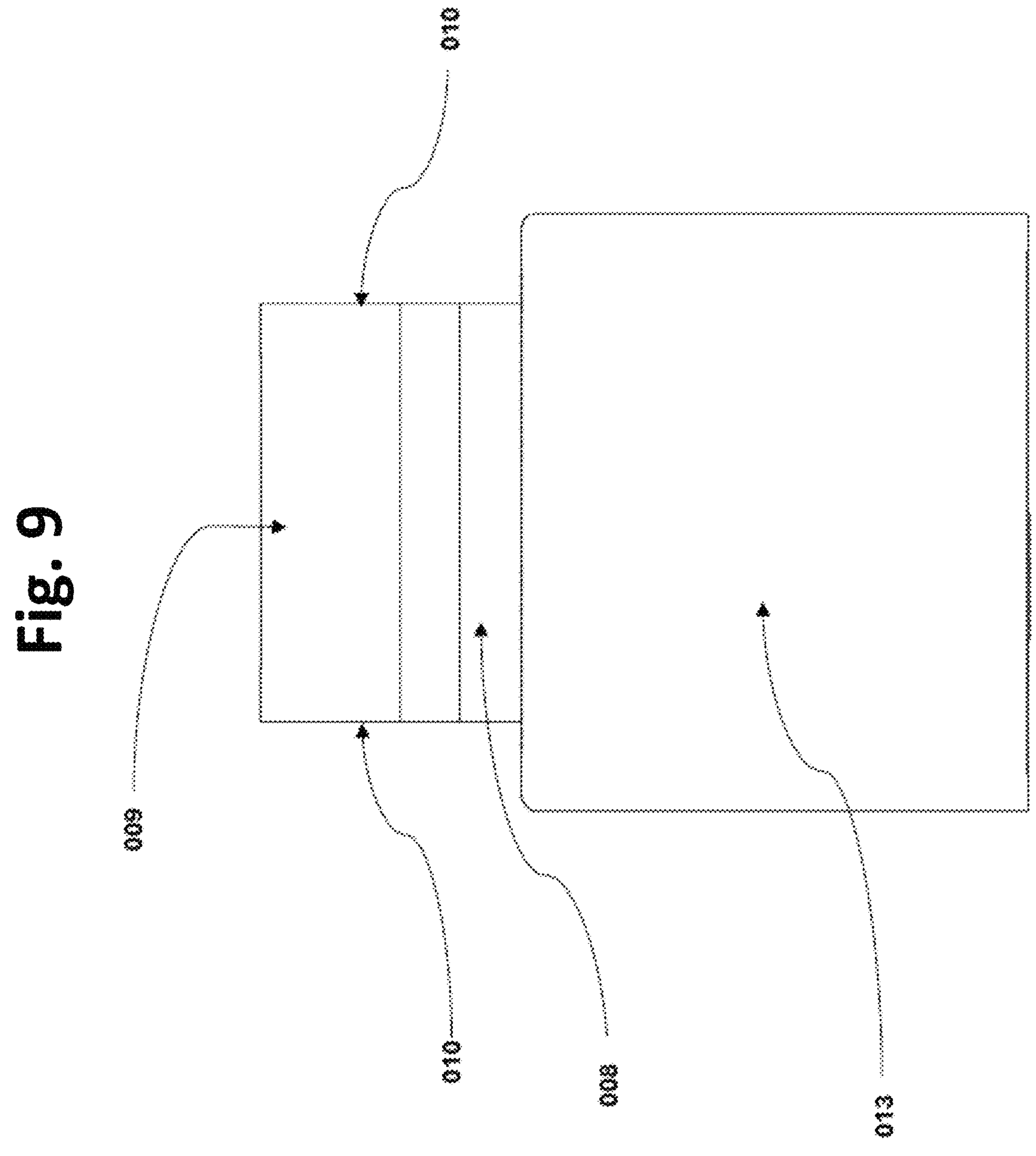

FIG. 9 is an orthogonal side view of the installation tool assembly.

Figure 10:
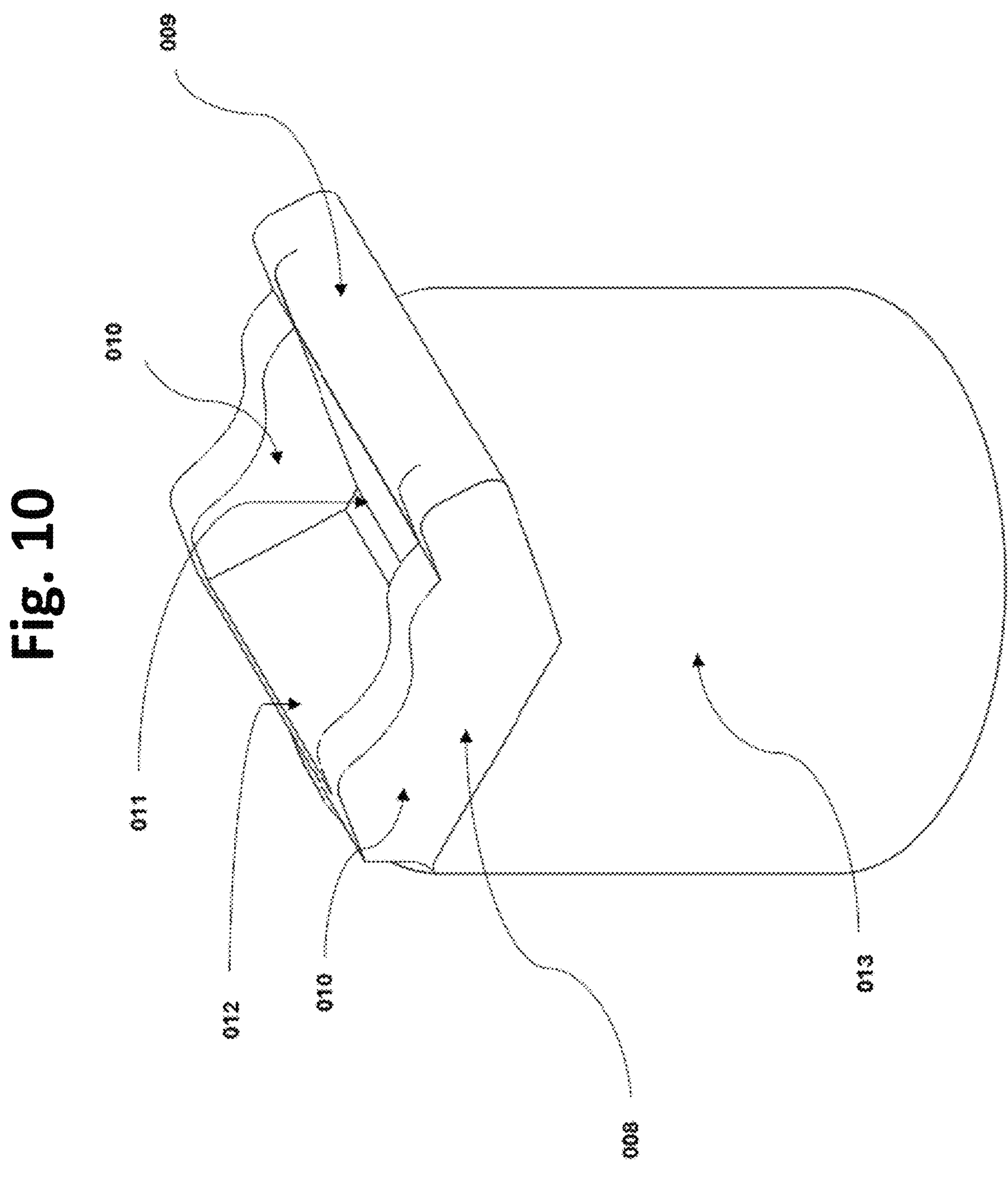

FIG. 10 is an isometric view of the installation tool assembly, illustrating component relationships.

Figure 11A:
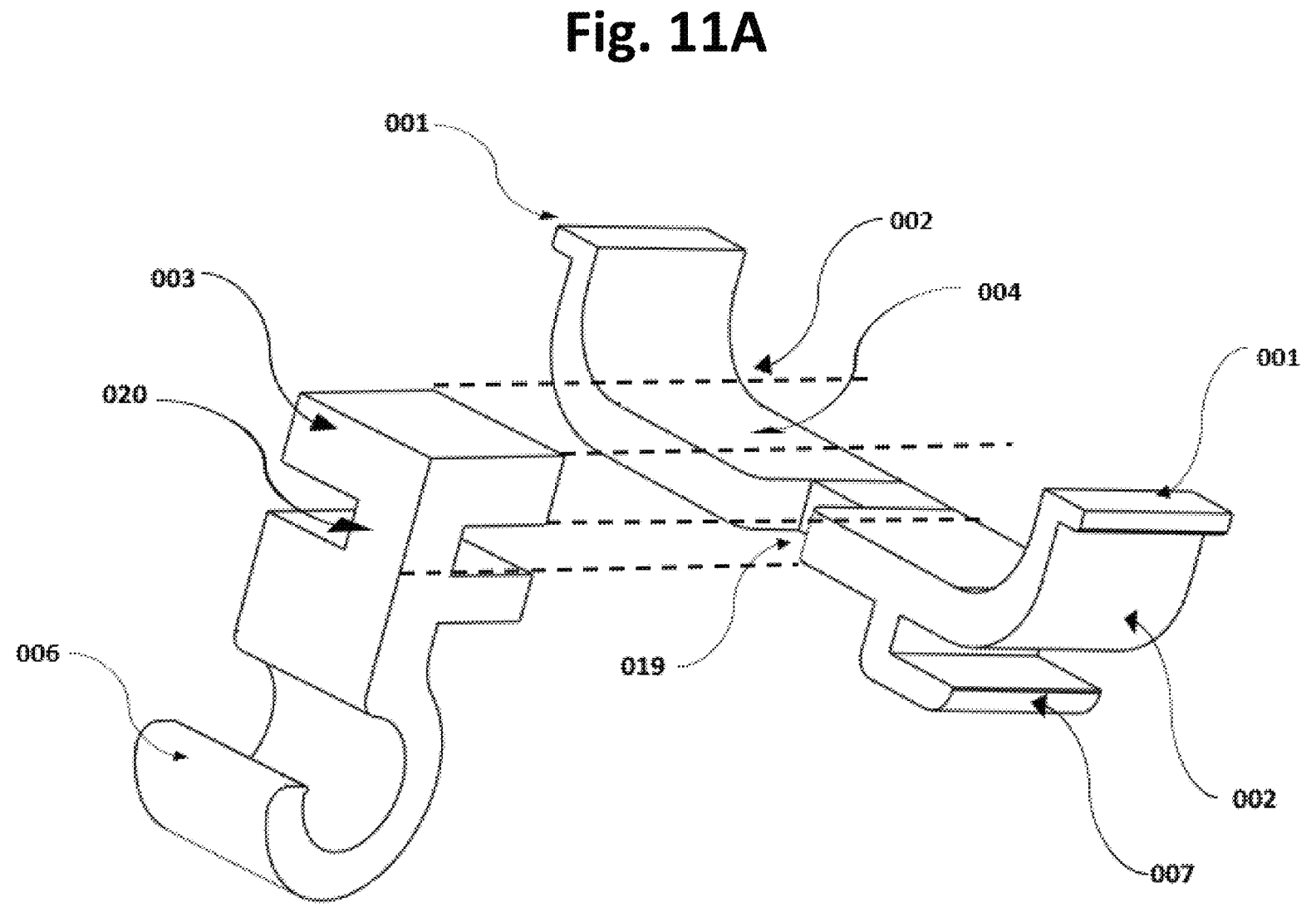

FIG. 11A is a perspective view showing how the insertable clip retention post connects to the insertable clip retention slot of the component body, in a configuration with a perpendicular object retainer.

Figure 11B:
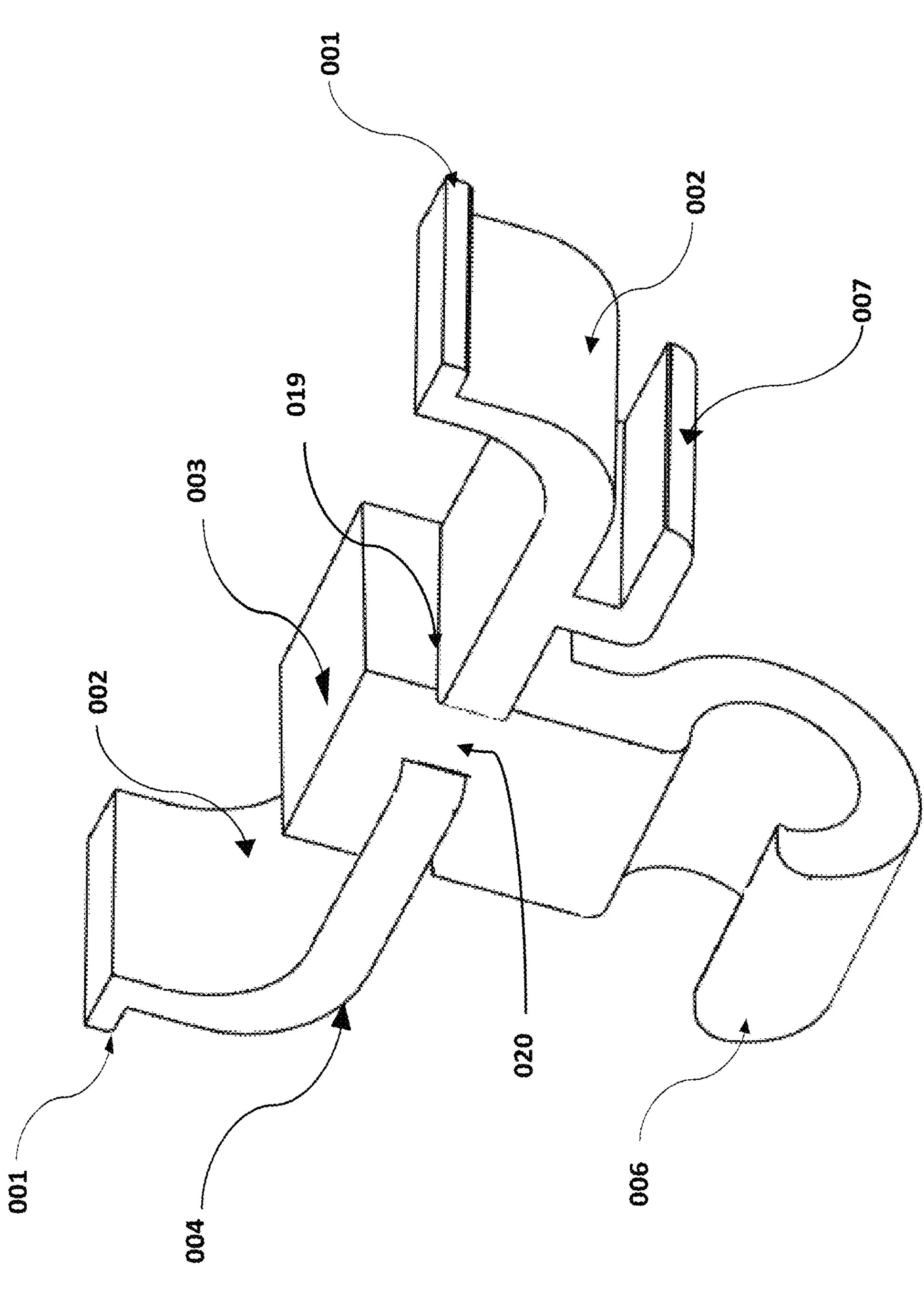

FIG. 11B is a perspective view showing the insertable clip retention post connected to the insertable clip retention slot of the component body, in a configuration with a perpendicular object retainer.

Figure 12A:
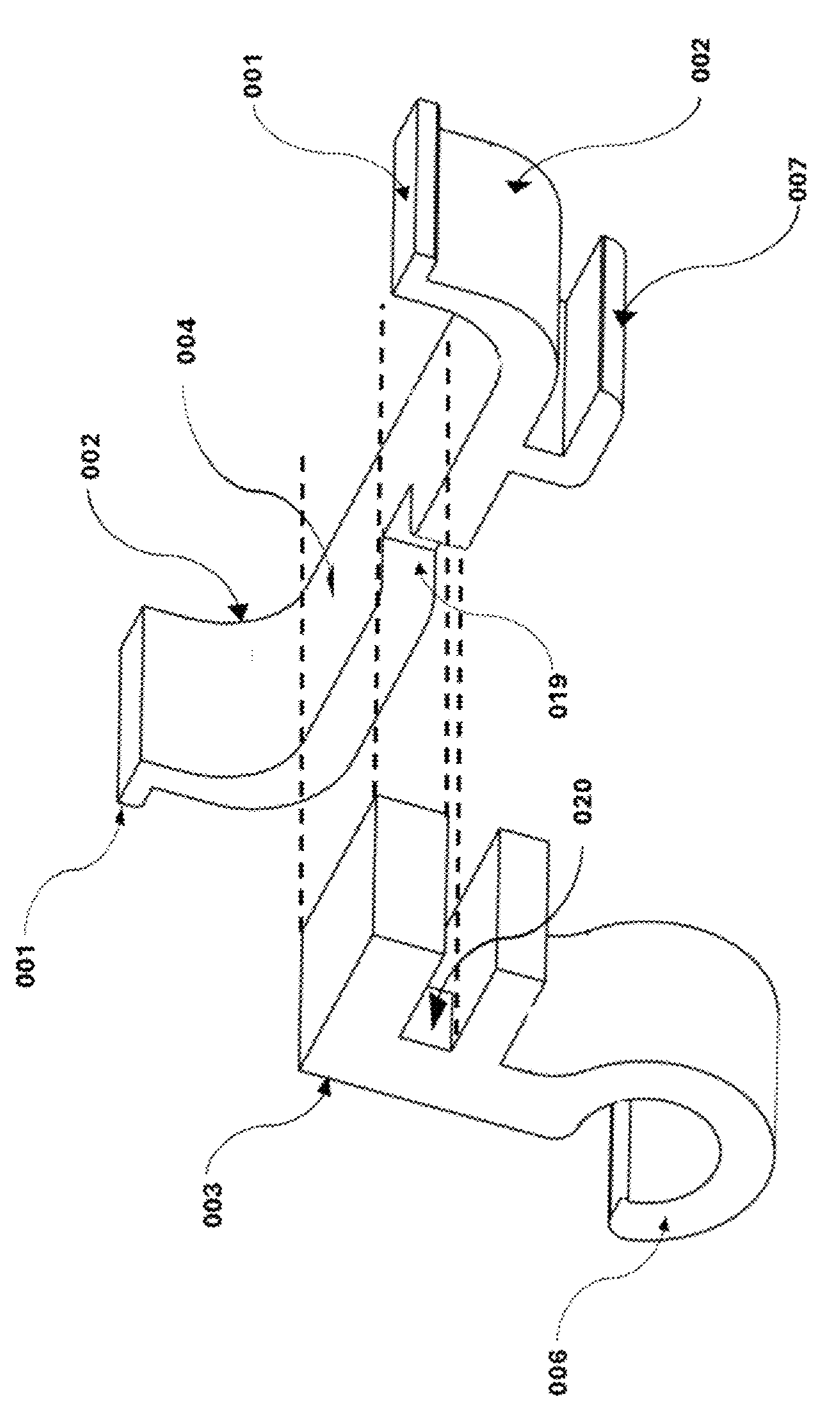

FIG. 12A is a perspective view showing how the insertable clip retention post connects to the insertable clip retention slot of the component body, in a configuration with a parallel object retainer.

Figure 12B:
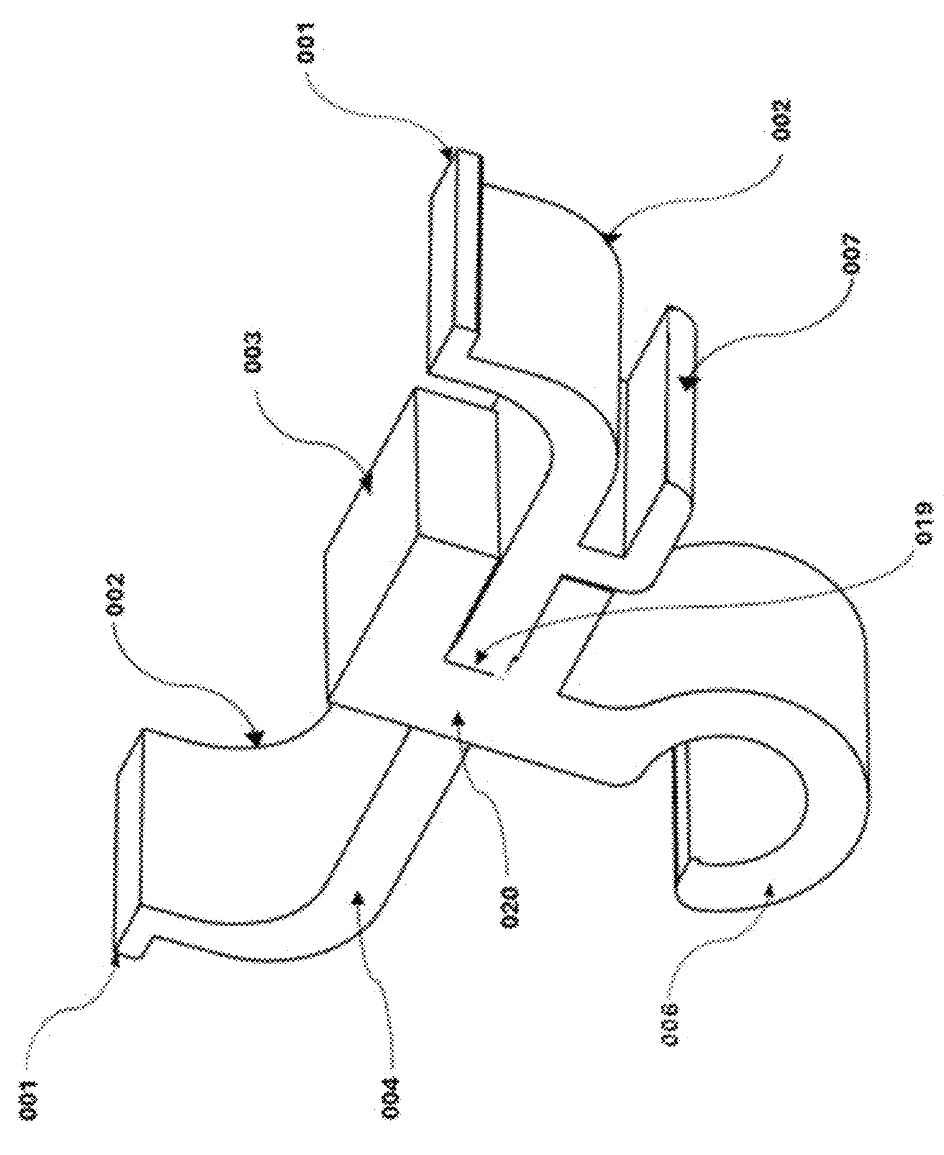

FIG. 12B is a perspective view showing the insertable clip retention post connected to the insertable clip retention slot of the component body, in a configuration with a parallel object retainer.

Figure 13A:
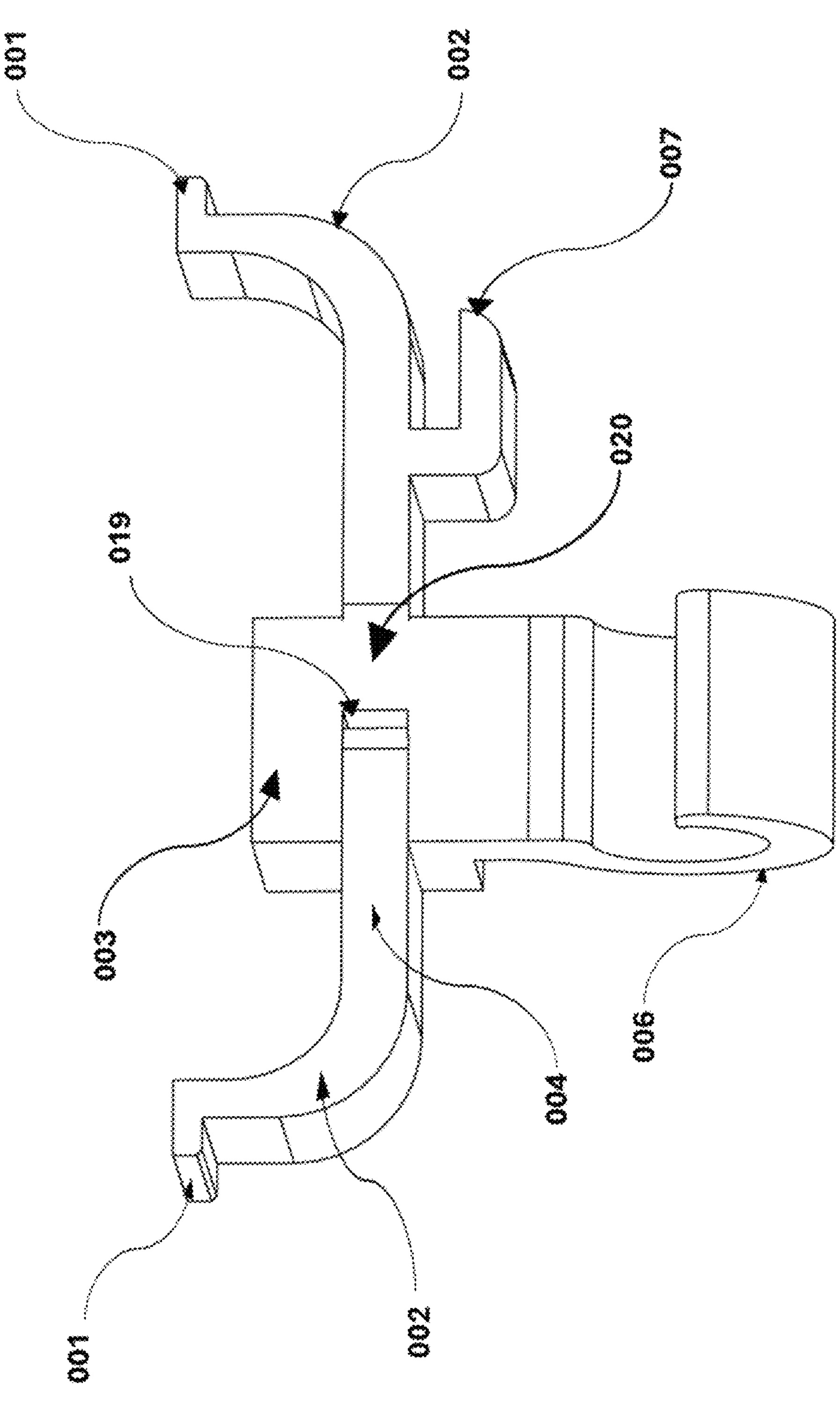

FIG. 13A is a perspective view of the multi-part clip device with the object retainer in a parallel configuration.

Figure 13B:
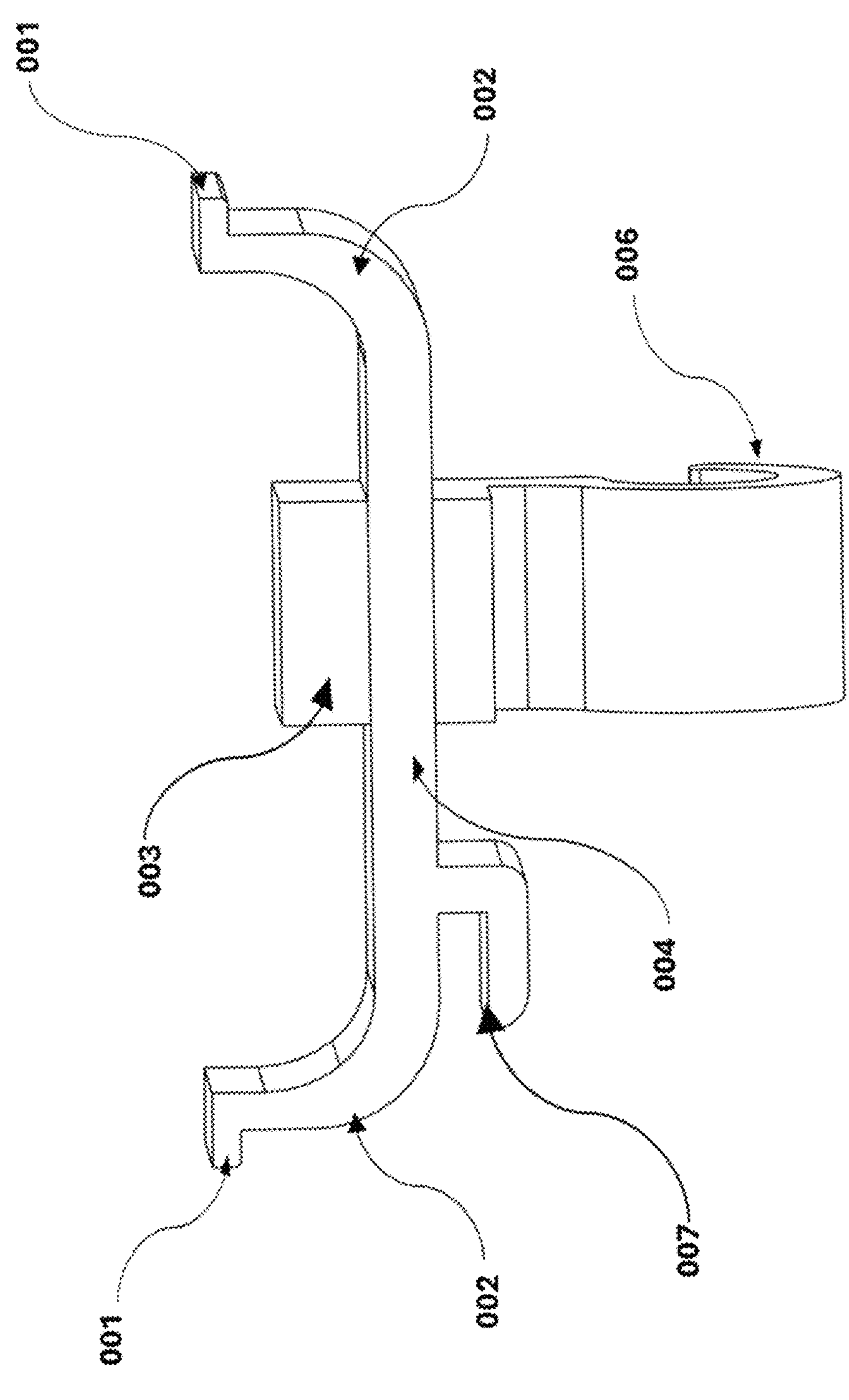

FIG. 13B is a perspective view of the same configuration as FIG. 13A, rotated 180 degrees.

Figure 13C:
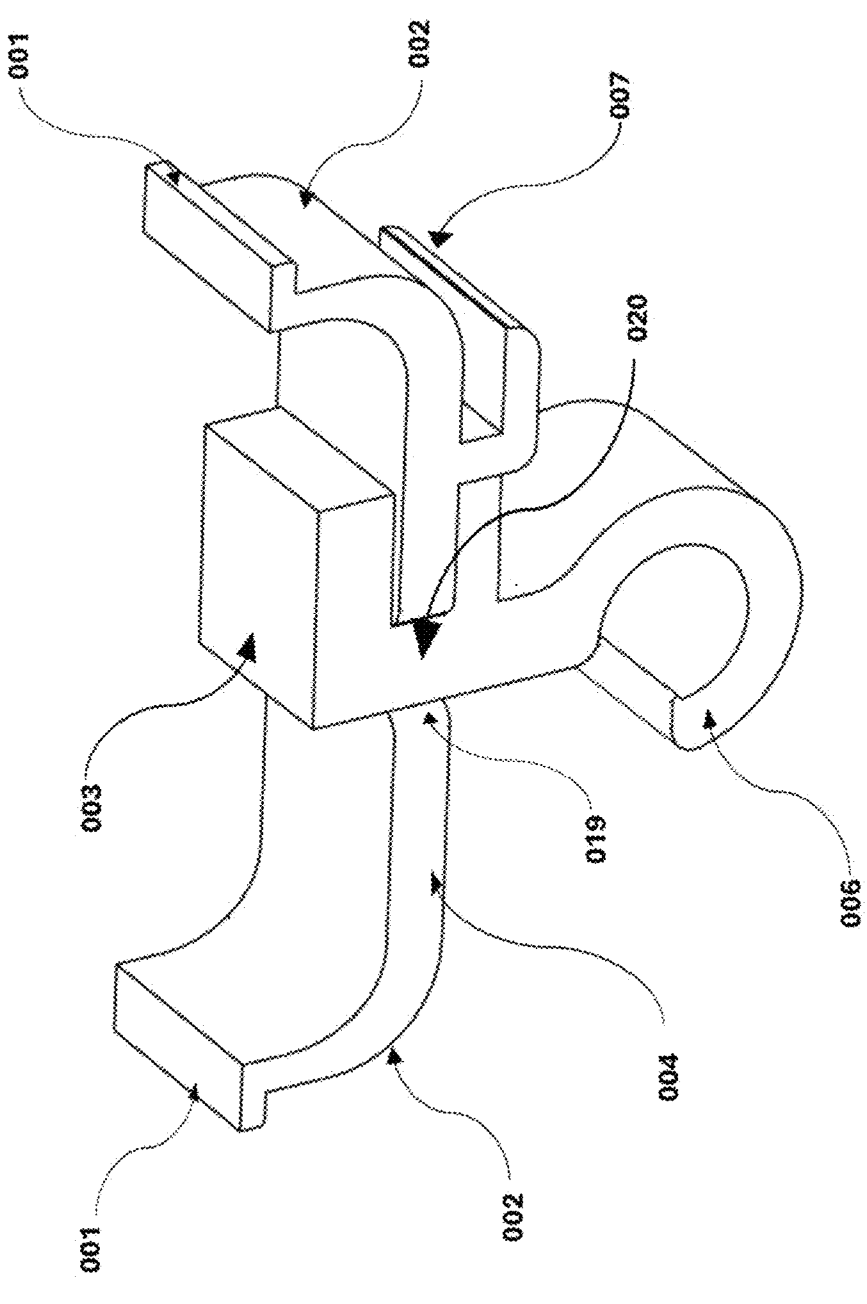

FIG. 13C is another perspective view showing a parallel object retainer configuration.

Figure 13D:
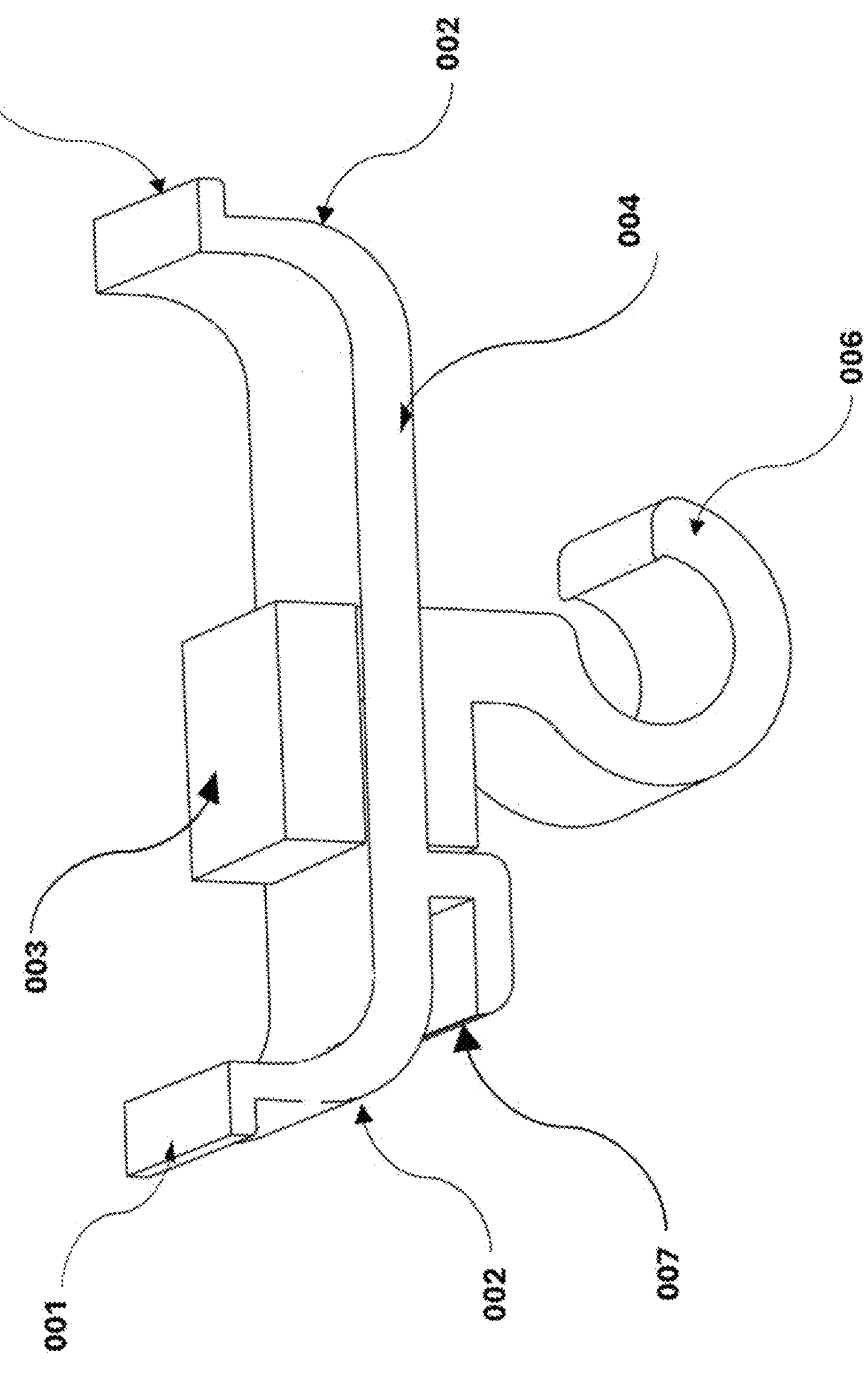

FIG. 13D is a perspective view of the configuration in FIG. 13C, rotated 180 degrees.

Figure 13E:
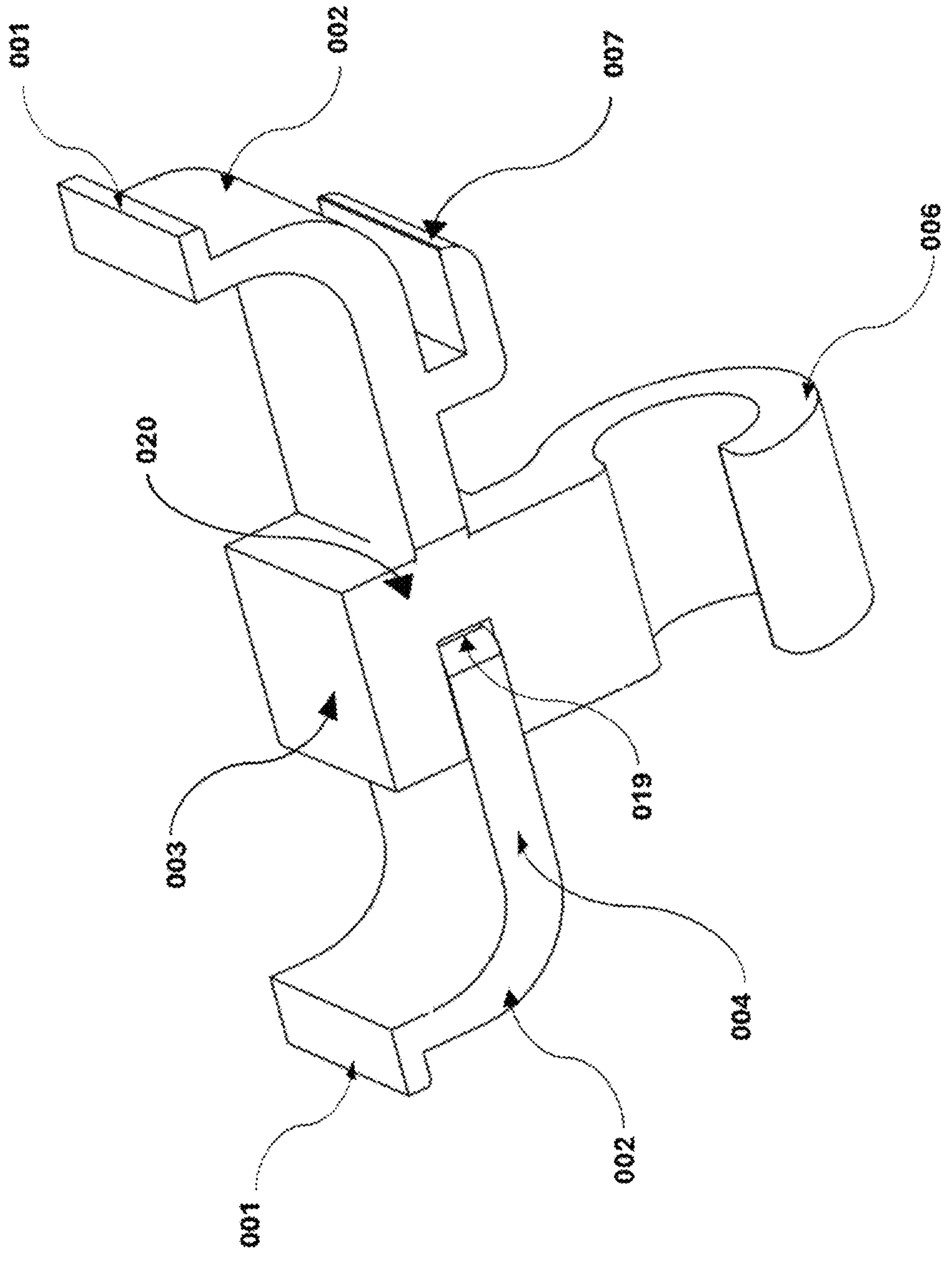

FIG. 13E is a perspective view showing a perpendicular object retainer configuration.

Figure 13F:
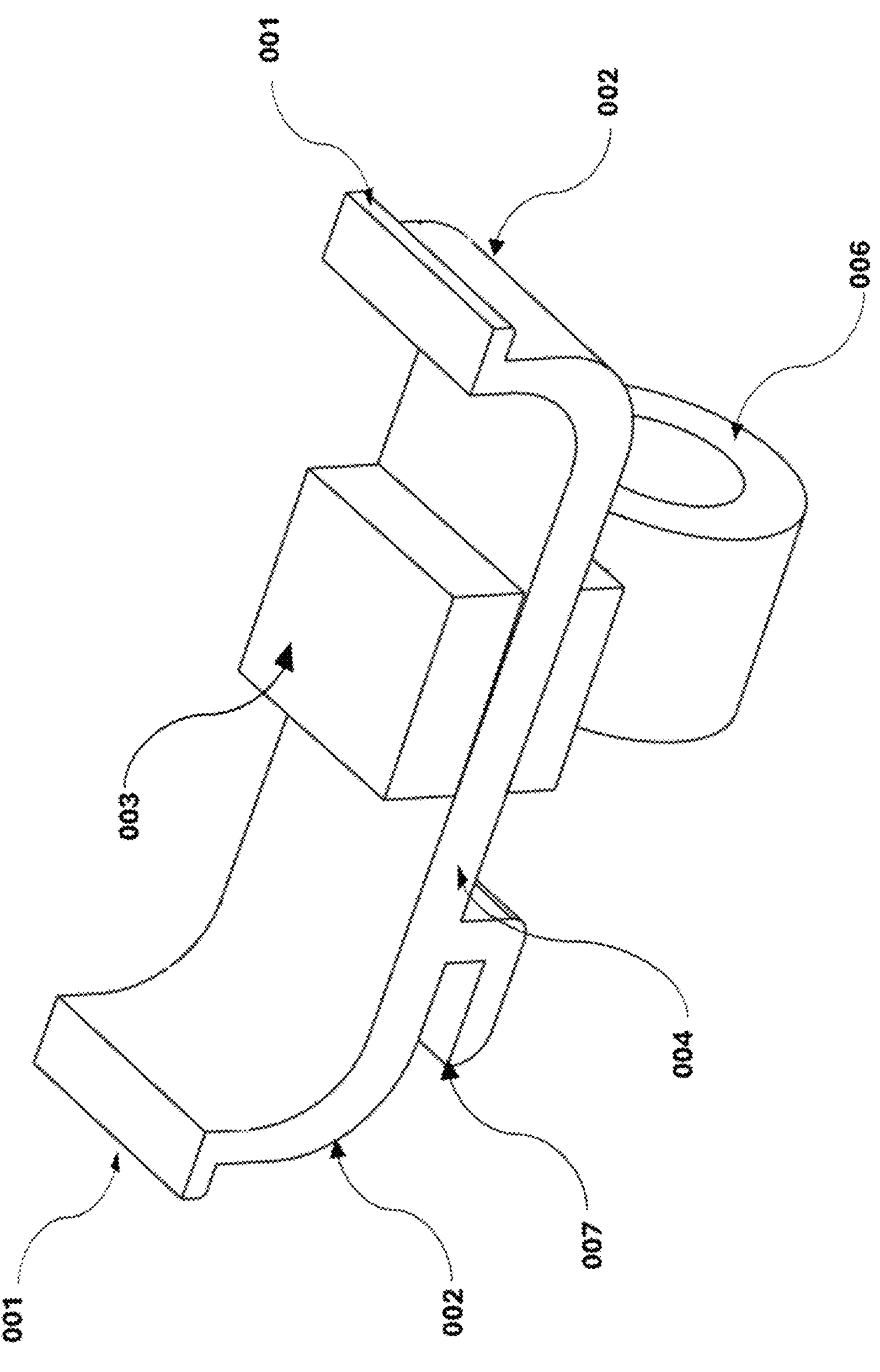

FIG. 13F is a perspective view of the configuration in FIG. 13E, rotated 180 degrees.

Figure 14A:
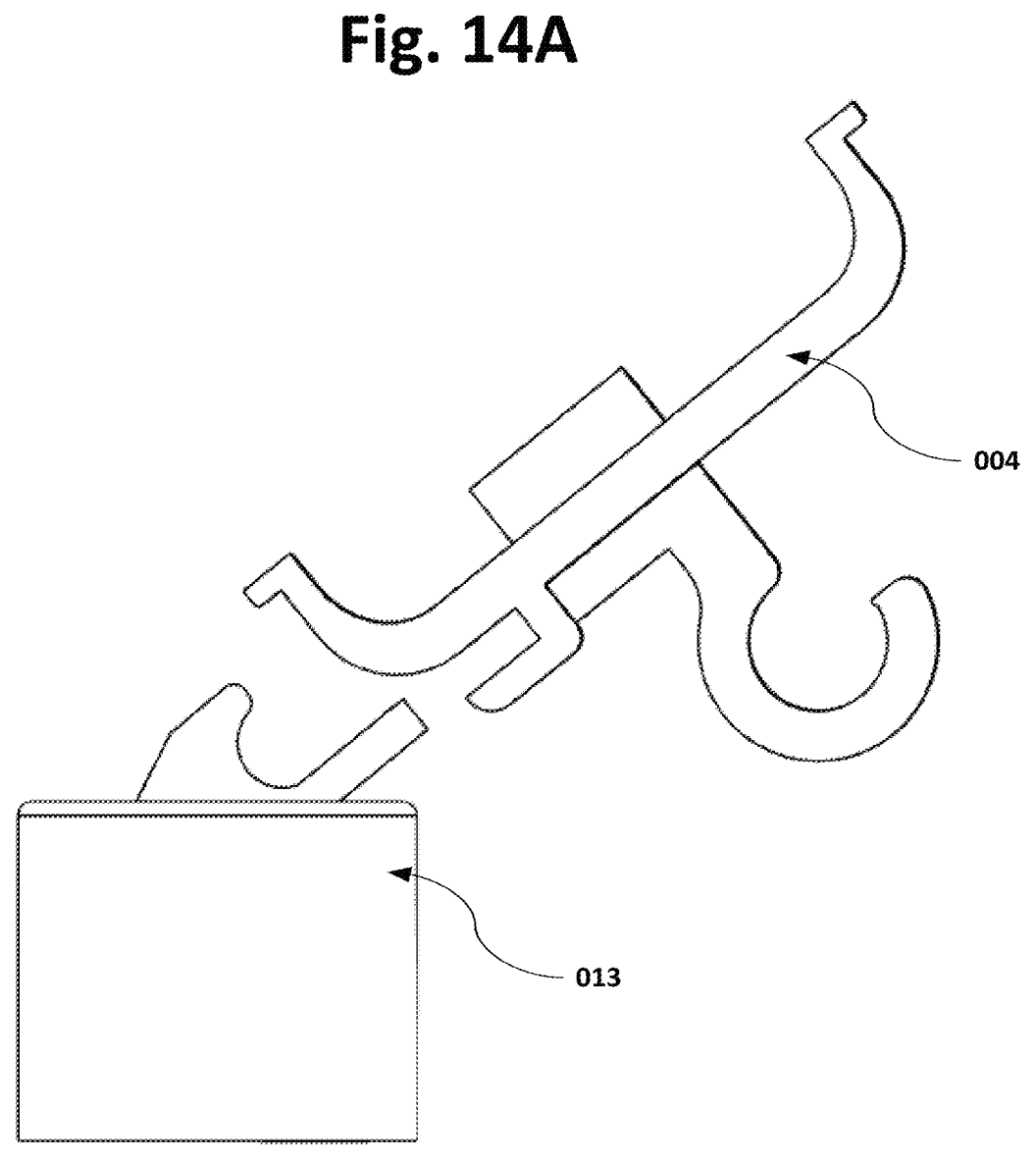

FIG. 14A is a side view of the multi-part clip device with an integrated locking mechanism to connect to an installation tool.

Figure 15A:
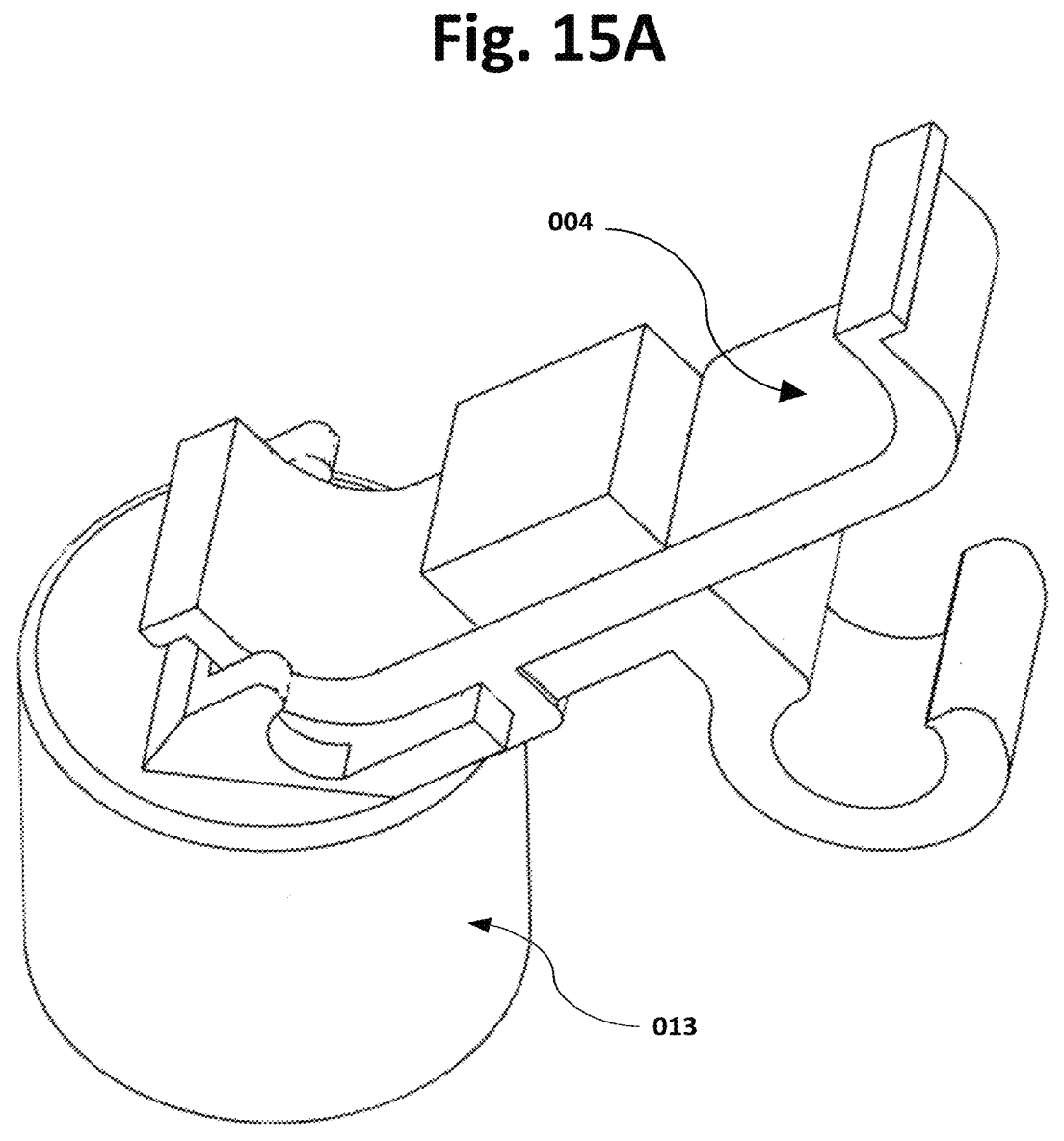

FIG. 15A is a perspective view showing the locking mechanism in an engaged position.

Figure 16A:
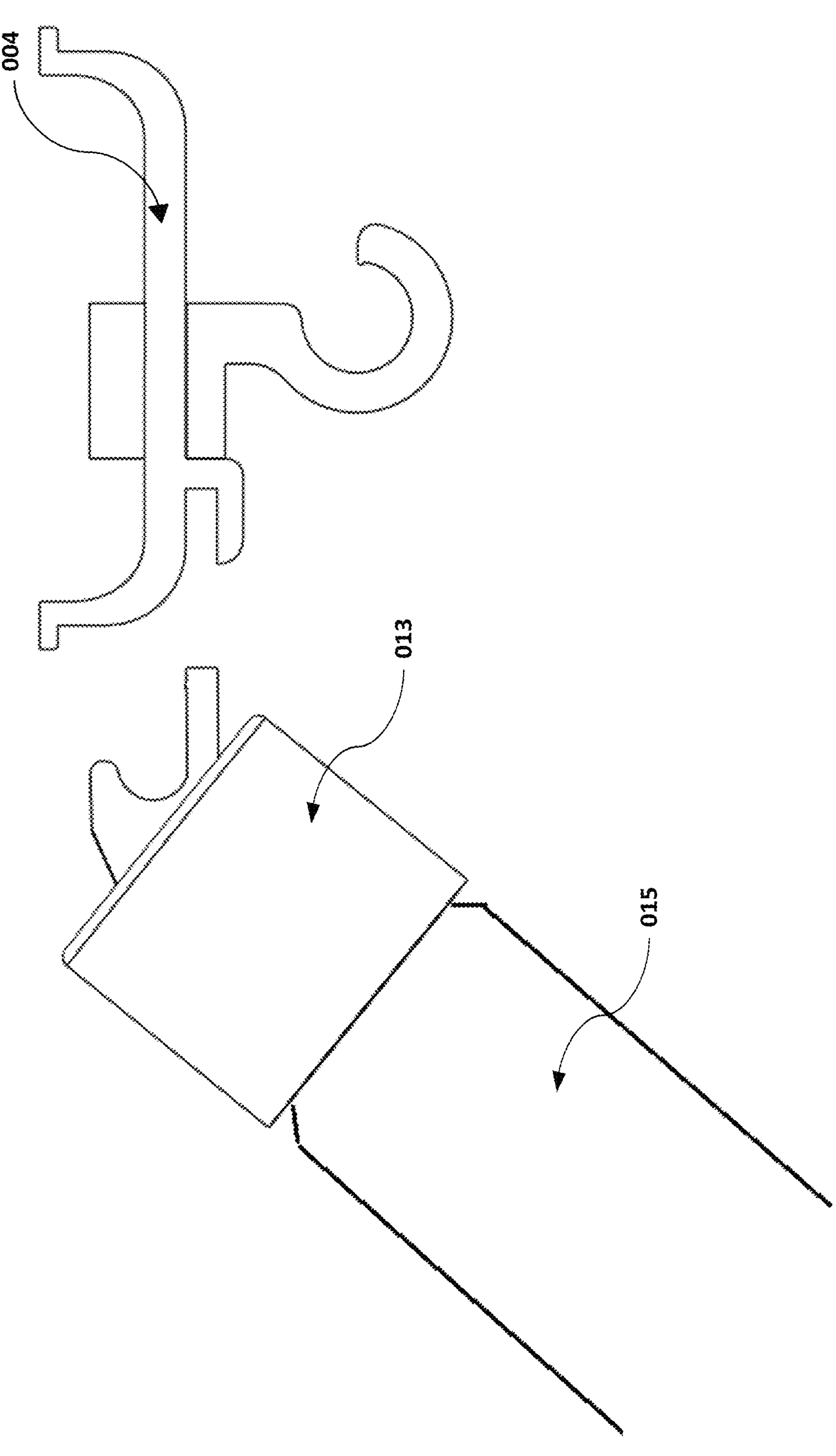

FIG. 16A is a view of the installation tool attached to an extension tool, ready to receive a multi-part clip device.

Figure 17A:
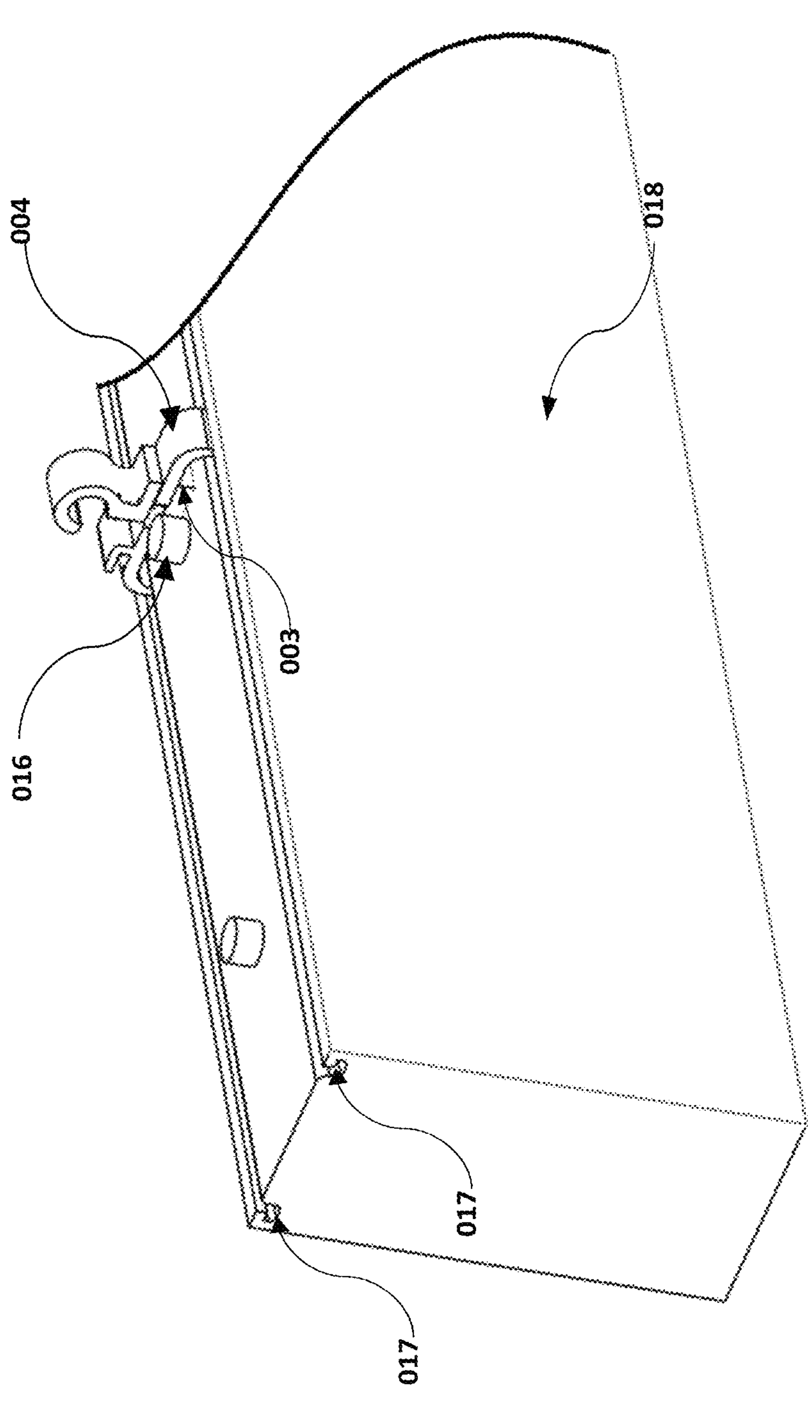

FIG. 17A is a cross-sectional view of the multi-part clip device installed on an aluminum framing channel, illustrating engagement between device components and the framing structure.

Figure 18:
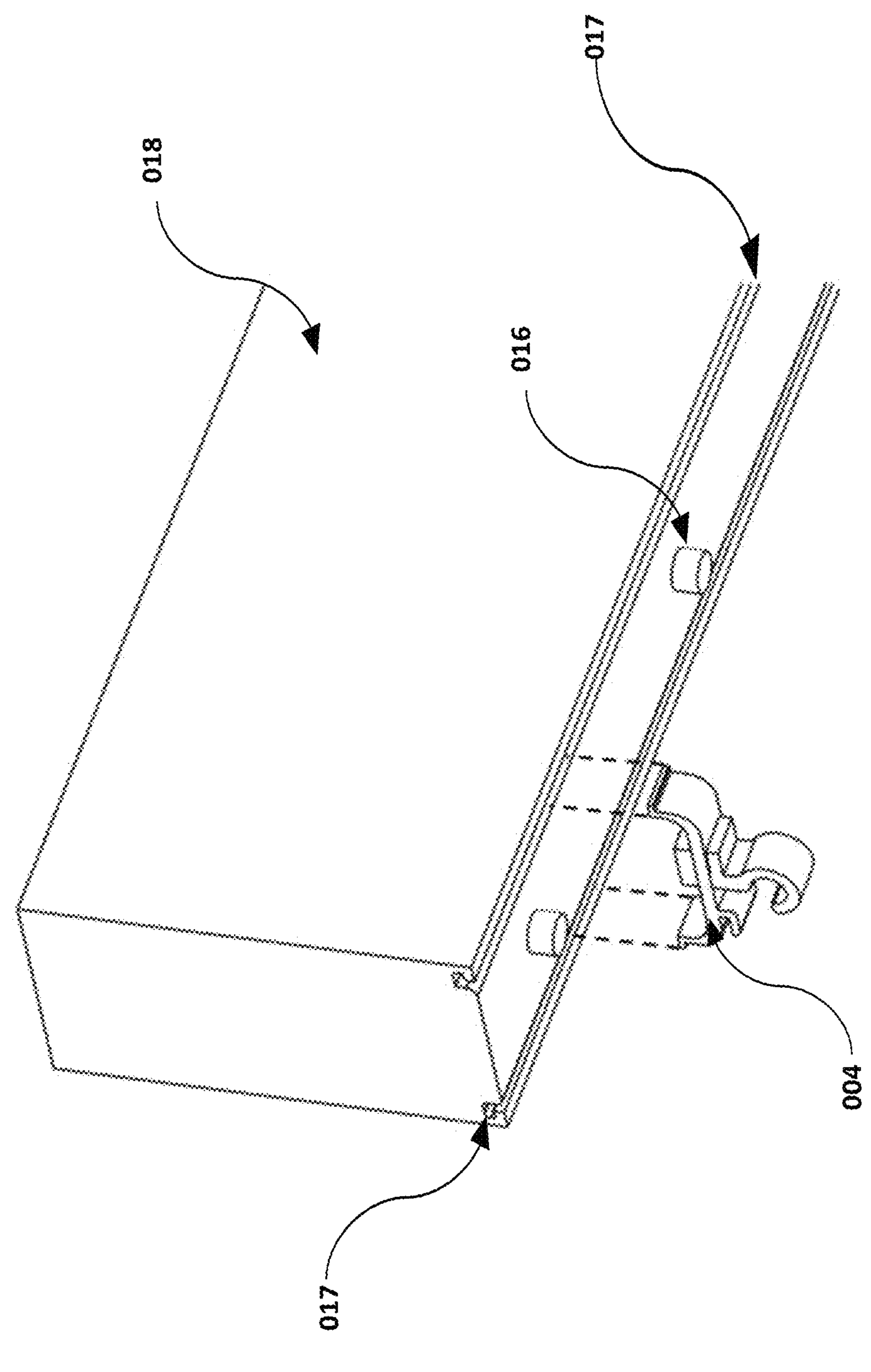

FIG. 18 is a cross-sectional view of the multi-part clip device before insertion into an aluminum framing channel.

Figure 19:
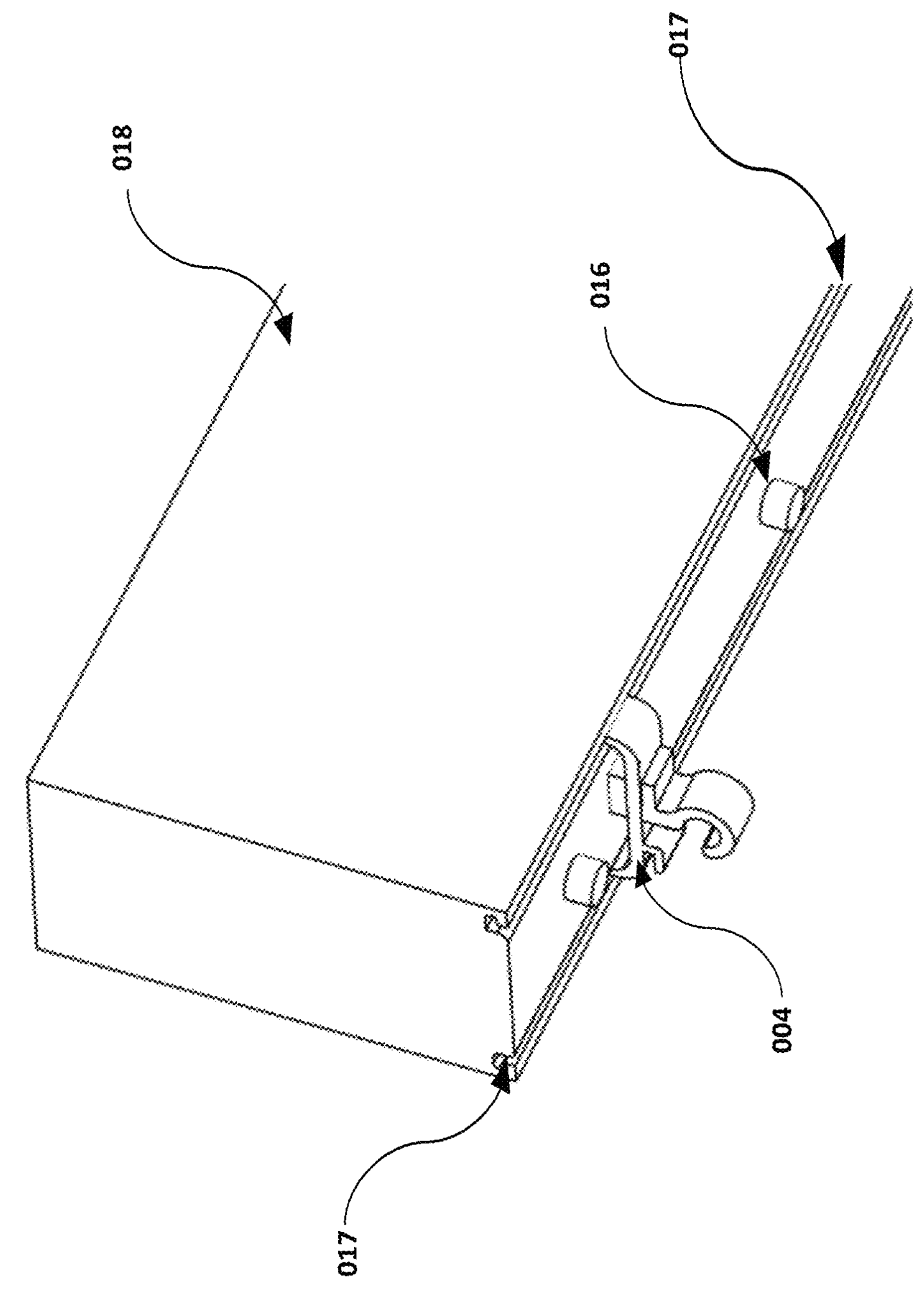

FIG. 19 is a cross-sectional view of the clip device installed into an aluminum framing channel.

Figure 20:
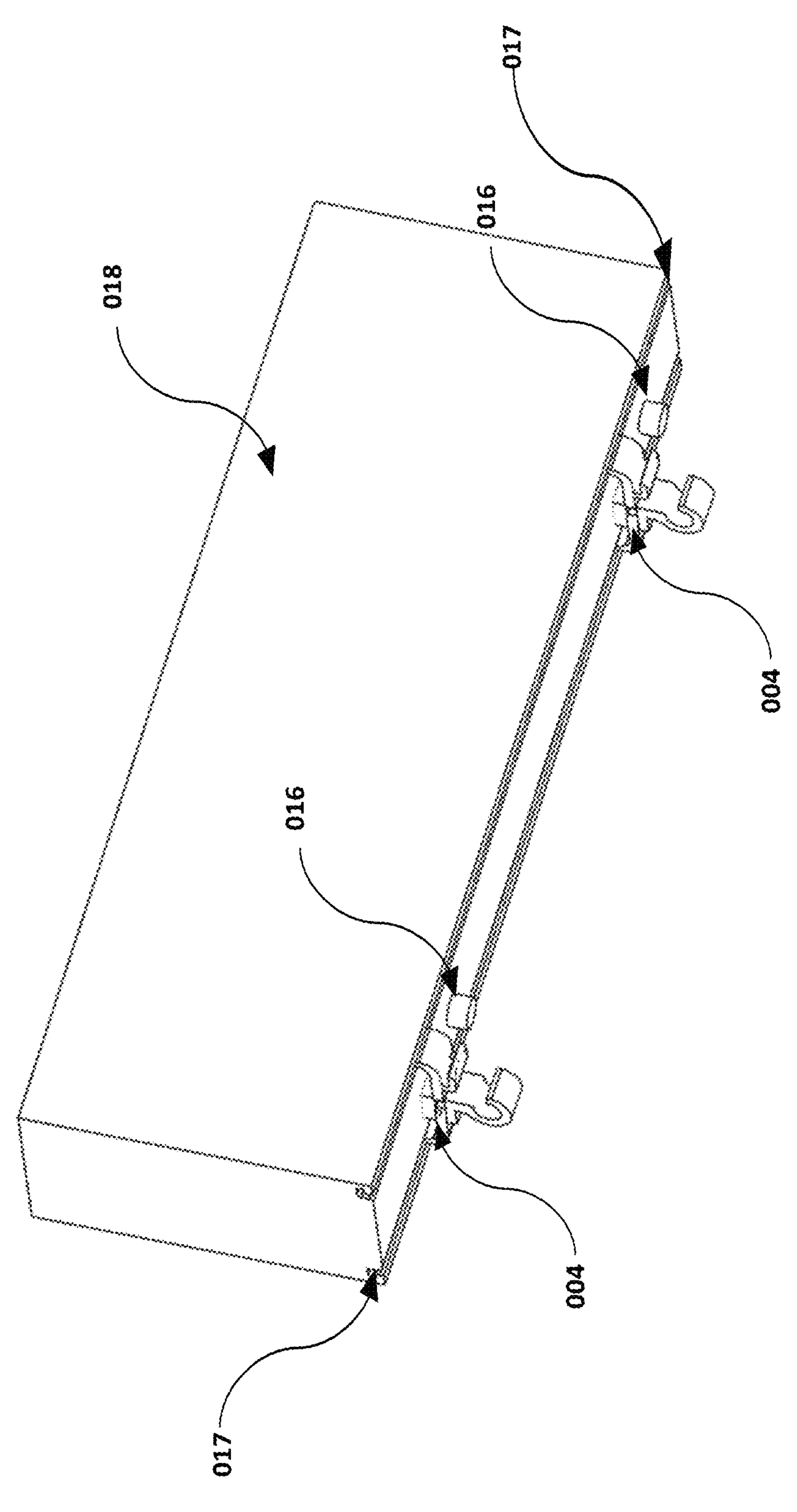

FIG. 20 is a cross-sectional view of multiple clip devices installed into an aluminum framing channel.

Figure 21:
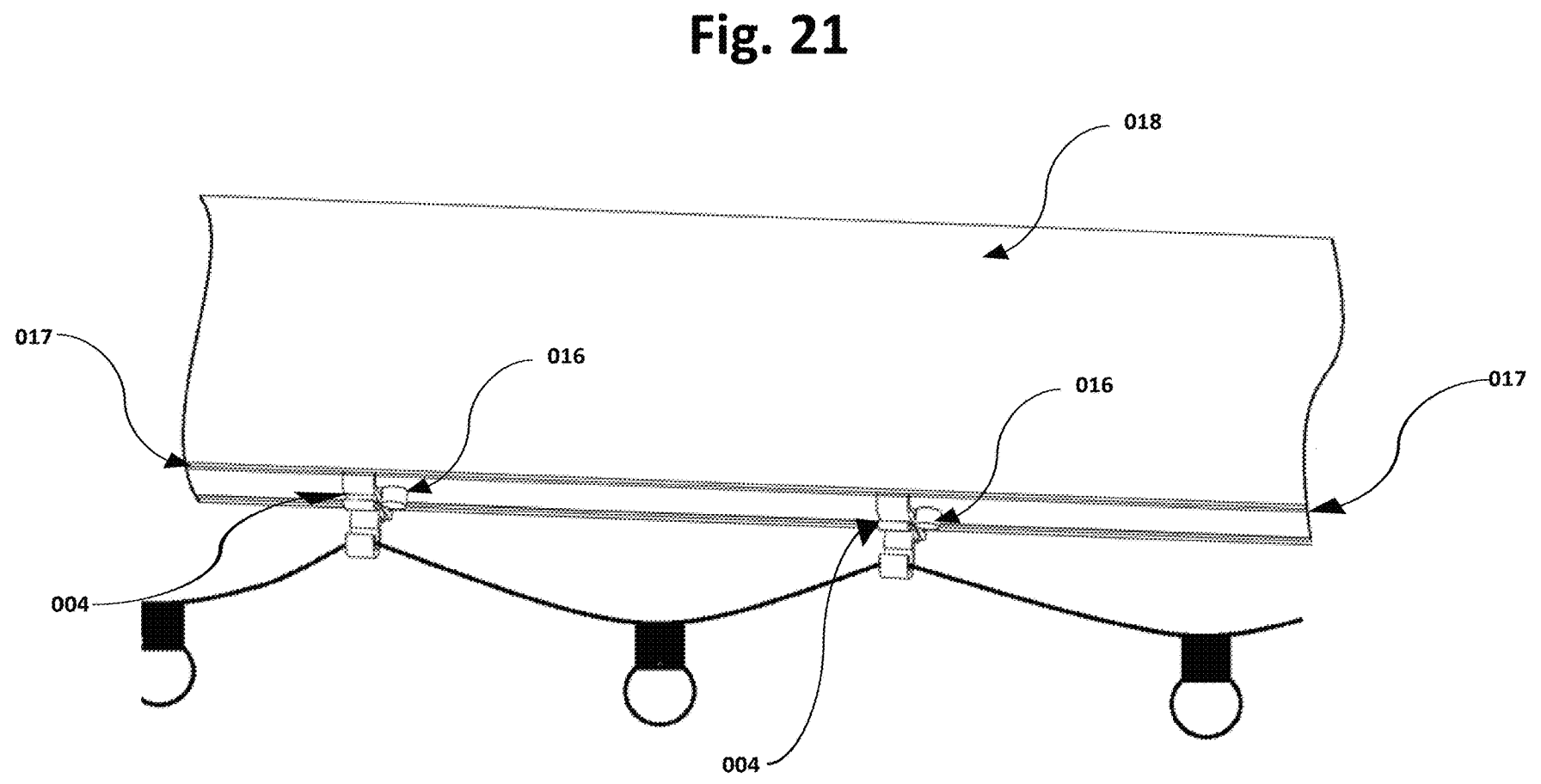

FIG. 21 is a cross-sectional view of multiple clip devices installed into an aluminum framing channel, with a sample object (e.g., a string of decorative lights) shown spanning the devices.

LIST OF FIGURE ITEMS

001 retention brace
002 spring tensioner curve
003 slide top limiter
004 component body
005 object retainer spring
006 object retainer
007 installation slot
008 angled tool head assembly
009 clip device retainer
010 clip device retention wall
011 clip device retention channel
012 clip device retention stop
013 clip device installation tool body
014 object hanging channel
015 extension tool
016 typical fastener
017 framing channels
018 framing
019 insertable clip retention slot
020 insertable clip retention post

DETAILED DESCRIPTION

The order of the steps in the disclosed processes may be altered within the scope of the invention.

In conjunction with the accompanying drawings, the following detailed description provides a more specific and detailed explanation of various embodiments of the multi-part clip device to hang objects within screen enclosures. These embodiments are provided to illustrate the invention but should not be seen as limiting its scope; the invention can be embodied in many different forms and is intended to be thorough and comprehensive to those skilled in the art.

For the purposes of promoting an understanding of the principles of a multi-part clip device to hang objects within screen enclosures, reference will now be made to the embodiments illustrated in the drawings and specific language will be used to describe the same, only as examples and not intended to be limiting.

The present disclosure describes a multi-part clip device system comprising structurally interlocking components—including a component body, spring tensioner curves, and a modular object retainer—designed to frictionally engage internal surfaces of aluminum screen enclosure framing to support hanging objects without adhesives or damage to the structure.

In some cases, the multi-part clip device may be available in different colors to match the color of the pool cage or screen enclosure. This color matching capability may allow the multi-part clip device to blend seamlessly with the existing structure, maintaining the aesthetic appearance of the enclosure.

The multi-part clip device system may be particularly useful for hanging decorative lights within screen enclosures. In addition to lights, the system may accommodate a variety of other objects, providing versatility in its applications. The ability to easily install and remove the clips may allow users to change decorations or lighting arrangements as desired without damaging the enclosure structure.

The installation tool may be designed to work in conjunction with the multi-part clip device, facilitating easy and secure placement of the multi-part clip devices on the aluminum framing, even in hard-to-reach areas of the enclosure. This tool may enable users to install clip devices at various heights and angles within the screen enclosure structure.

The multi-part clip device may be designed to securely attach to aluminum framing channels commonly found in screen enclosures. In certain embodiments, the multi-part clip device may include multiple interlocking or cooperative components, such as a component body 004 and an object retainer 006, which work together to provide a secure and adjustable mounting solution.

The multi-part clip device may be constructed from various materials, including but not limited to: plastics (e.g., ABS, nylon, PET, polypropylene, polystyrene, polyethylene, polycarbonate, polyurethane), high-strength polymers (e.g., high-impact polystyrene, polyetherimide, polyether ether ketone, polyphenylene sulfide), and metals (e.g., aluminum or carbon fiber). The selected material may influence the clip's durability, flexibility, and weight-bearing capacity.

In certain embodiments, the multi-part clip device may comprise a component body 004 and a cooperating object retainer 006 configured to engage with the component body. The object retainer 006 may be reversibly oriented and retained within the component body 004 through a mechanical fit, elastic deflection, or spring tension. Such multi-part configurations may enable increased installation flexibility and accommodate a variety of object-hanging orientations or load profiles.

In some cases, the multi-part clip device may be designed for different sizes of square aluminum tubing, ranging from 25.4 mm to 203.2 mm (1 inch to 8 inches).

The multi-part clip device thickness may vary, not meant to be limiting, from 12.7 mm to 5.08 mm (0.5 to 0.2 inches), with an average thickness of 2.54 mm (0.1 inches).

In certain embodiments, larger clips for 6-8 inch aluminum frames may be manufactured using reinforced polymer blends or metal components to maintain structural integrity under increased load. These variants may incorporate thicker retention braces and larger tensioner radii to accommodate the wider frame channel.

The multi-part clip device dimensions, not meant to be limiting, are approximately 45.72 mm long, 12.7 mm wide, and 22.86 mm tall (1.8 inches long, 0.5 inches wide, and 0.9 inches tall). These are dimensions for standard 50.8 mm (2 inch) aluminum frames. However, the dimensions may change based on production methods, the use case of the clip (i.e., heavier or lighter objects), manufacturing materials, and the environment where the multi-part clip device is deployed.

A second version of the multi-part clip device dimensions may be, not meant to be limiting, approximately 45.72 mm long, 25.4 mm wide, and 22.86 mm tall (1.8 inches long, 1 inch wide, and 0.9 inches tall).

The installation tool dimensions may be, not meant to be limiting, approximately 25.4 mm in diameter, 33.02 mm tall, and have a 19.05 mm outside diameter with five threads per 25.4 mm (1 inch in diameter, 1.3 inches tall, and have a 0.75 inch outside diameter with five threads per inch).

The multi-part clip device may include at least one retention brace 001 positioned at each longitudinal end of the component body 004. These retention braces 001 provide structural support and allow the multi-part clip device to securely attach to the interior surfaces of aluminum framing channels 017. In some embodiments, the retention braces 001 may be symmetrically arranged to promote balanced force distribution and improved alignment during installation.

A spring tensioner curve 002 may extend from each retention brace 001. This curved section contributes to the multi-part clip device's tensioning functionality by elastically deforming during insertion into the framing channel 017 and subsequently applying a biasing force that retains the clip in position, allowing it to maintain a secure grip within the framing channel 017. The spring tensioner curve 002 may be engineered to provide optimal tension for various object weights. The geometry of the spring tensioner curve 002, including its defined radius, may be tailored to maintain optimal frictional engagement for a range of object weights and framing tolerances.

The multi-part clip device may include a slide top limiter 003 positioned above the object retainer 006. This feature helps maintain the multi-part clip device's placement on the aluminum framing 018, particularly when the framing is slanted. The slide top limiter 003 may be designed to rest against protruding screws in the framing, preventing unwanted movement.

The component body 004 forms the central support structure of the multi-part clip device. It may serve as the primary interface between retention features (such as braces 001 and spring curves 002) and the object retainer 006 (described further below). The component body 004 may vary in length or wall thickness to accommodate different aluminum framing sizes and installation geometries. The component body may vary in length to accommodate different sizes of aluminum framing profiles.

The multi-part clip device may further include an object retainer spring 005 and an object retainer 006 configured to securely hold one or more objects in place. These components may be integrated with or extend from the component body 004 and may be oriented either parallel or perpendicular to the longitudinal axis of the clip device, depending on the intended use. The object retainer spring 005 may have a curved or tapered geometry that enables resilient deflection, allowing objects of varying sizes or thicknesses to be inserted and retained through elastic biasing.

The object retainer 006 is a discrete component configured to connect to the component body 004 through a mechanical interface. In certain embodiments, the object retainer 006 may include an insertable clip retention post 020 that is inserted into a corresponding insertable clip retention slot 019 in the component body 004. This connection may be achieved by rotational movement—such as turning the object retainer 006 at an angle relative to the component body 004—until the post 020 engages with the slot 019. Once engaged, the connection between the object retainer 006 and the component body 004 is maintained via mechanical fit or retention features, thereby allowing the assembled clip device to retain its structural integrity during use.

The clip device may be removed from the structural channel and the object retainer 006 may be disconnected from the component body 004. In certain embodiments, the object retainer 006 may then be reconnected in an alternate orientation—such as rotated 90 or 180 degrees—relative to the component body 004 to accommodate different object-hanging configurations.

An installation slot 007 may be included in some clip device variations, providing an interface point for the installation tool. This slot 007 may be positioned between the object retainer spring 005 and the component body 004, facilitating easy attachment and removal of the multi-part clip device.

An installation tool may comprise an angled tool head assembly 008 designed to hold and position the multi-part clip device during installation. The angle of this assembly may be optimized to allow proper insertion of the multi-part clip device into aluminum framing channels.

The installation tool may feature a clip device retainer 009 extending from the angled tool head assembly. This component may be shaped to securely hold the multi-part clip device during the installation process, preventing it from falling or shifting.

Clip device retention walls 010 may be incorporated into the installation tool, providing lateral support and stability during clip device installation. These walls may be designed to accommodate various clip device sizes and prevent lateral movement during the installation process.

A clip device retention channel 011 may be formed within the installation tool, providing a designated area for clip device placement. This channel may be sized to fit standard clip device dimensions while allowing for easy insertion and removal.

The installation tool may include a clip device retention stop 012 positioned at the rear of the multi-part clip device retention channel. This feature may limit backward movement of the multi-part clip device during installation, ensuring proper positioning.

A clip device installation tool body 013 may form the main structural support of the installation tool. This body may be designed to provide stability during use and may include features for attaching to extension poles or other handling devices.

Referring to FIG. 1A, the multi-part clip device may include a component body 004 configured to engage with the structural channel of an aluminum framing structure. At least one retention brace 001 may extend from the component body 004 and is configured to engage with the structural channel to limit lateral or vertical displacement. These retention braces 001 provide structural reinforcement and contribute to the secure positioning of the device by distributing insertion forces and stabilizing the device within the channel during and after installation. Additionally, the component body 004 includes a spring tensioner curve 002 having a defined radius, which is configured to elastically deform during installation and apply an outward force against the opposing inner walls of the structural channel, thereby securing the multi-part clip device in a retained position. An installation slot 007 may be present to interface with an installation tool. In some embodiments, the component body 004 further includes an insertable clip retention slot 019, which is configured to receive a mating feature of an object retainer, enabling a reversible mechanical connection between the two parts.

A spring tensioner curve 002 may extend from each retention brace 001, as shown in FIG. 2. The spring tensioner curve 002 contributes to the clip's tensioning mechanism, enabling it to maintain a secure grip within the framing channel. In some embodiments, the spring tensioner curve 002 may be engineered to deliver optimal tension for supporting various object weights, up to 6 pounds. The curve may have a defined radius specifically configured to achieve this optimal tension. For loads exceeding 3 pounds, spring tensioner curves may be constructed with a reinforced arc profile using glass-filled nylon or aluminum alloy, and retention braces may include undercut edges to prevent slippage from internal frame walls.

Referring to FIGS. 1A-4A, the component body 004 of the multi-part clip device may include an insertable clip retention slot 019. The insertable clip retention slot 019 is configured to receive an object retainer 006 via an insertable clip retention post 020, as shown in FIGS. 5A-5C.

Referring to FIGS. 5A-5C, the multi-part clip device may incorporate an object retainer 006 configured to securely hold items. In this variation, the object retainer 006 includes an insertable clip retention post 020, which is configured to engage with the insertable clip retention slot 019 of the component body 004. The object retainer 006 may be rotated in 90-degree increments, allowing it to be positioned either parallel or perpendicular to the component body 004. The object retainer 006 further includes an insertable object retainer spring 005 having a defined radius, which is engineered to flex upon insertion of an object and thereby enhance the gripping force to securely retain the object in place.

Referring to FIGS. 5A-5C, the multi-part clip device includes a connecting object retainer 006 configured to securely hold items. The object retainer 006 features an integrated slide top limiter 003. When the object retainer 006 is connected to the component body 004, the slide top limiter 003 is positioned between the component body 004 and the framing structure. The slide top limiter 003 functions as a mechanical stop, helping to prevent vertical movement of the multi-part clip device when installed on slanted or vertical framing members.

As illustrated in FIGS. 11A and 11B, one variation of the multi-part clip device features the object retainer spring 005 and object retainer 006 oriented perpendicular to the main body axis. In FIG. 11A, the object retainer 006 and the component body 004 are shown as separate components. Inserting the object retainer 006, via the insertable clip retention post 020, into the insertable clip retention slot 019 of the component body 004 results in a single, assembled unit. This perpendicular orientation may facilitate alternative mounting configurations and accommodate a variety of object types.

Similarly, as shown in FIGS. 12A and 12B, another variation of the multi-part clip device features the object retainer spring 005 and object retainer 006 oriented parallel to the main body axis. In FIG. 12A, the object retainer 006 and the component body 004 are depicted as separate components. Upon insertion of the object retainer 006, via the insertable clip retention post 020, into the insertable clip retention slot 019 of the component body 004, the two components form a single integrated unit. This parallel orientation may also support various mounting configurations and enable secure attachment of different object types.

FIGS. 13A-13F show typical assembled perspective views of the multi-part clip device in various orientations and configurations. These figures illustrate how the component body 004 and object retainer 006 integrate into a single, functional unit, demonstrating possible mounting angles, object orientations, and visual appearances after installation on aluminum framing structures.

An embodiment of the multi-part clip device is shown in FIG. 14A. In this variation, an installation slot 007 may be included to provide an interface point for an installation tool. The installation slot 007 may be positioned between the object retainer 006 and the component body 004, facilitating easier attachment and removal of the clip device.

The installation tool may be configured to aid in the positioning, installation, and removal of clip devices within screen enclosures. Referring to FIG. 6, the installation tool may include an angled tool head assembly 008 positioned at the upper end of the tool body. The angled tool head assembly 008 may project outward at an angle from the main vertical body of the tool, allowing optimal alignment with aluminum framing during installation.

As shown in FIG. 7, a clip device retainer 009 may be located at the distal end of the angled tool head assembly 008. The clip device retainer 009 may have a curved profile designed to engage with the multi-part clip device, providing a stable hold throughout the installation process. Two clip device retention walls 010 may be positioned on opposite sides of the tool head, forming a channel—referred to as the clip device retention channel 011—which provides a seat for the multi-part clip device during insertion.

FIG. 8 illustrates a top orthogonal view of the installation tool, showing the internal layout of components within the angled tool head assembly 008. A clip device retention stop 012 may be located at the rear of the clip device retention channel 011 to limit rearward movement of the clip device and ensure proper seating prior to installation.

Referring to FIG. 9, the installation tool may include a main tool body 013 that forms the primary vertical structure of the device. The tool body 013 may provide structural stability, ergonomic handling, and serve as the primary interface surface for the user during operation.

In some embodiments, the installation tool may be adapted to connect to a telescoping extension pole. This feature may enable users to install clip devices at elevated or otherwise difficult-to-reach locations within screen enclosures. FIG. 10 presents an isometric view of the tool, illustrating the cooperative arrangement of components to form a unified installation assembly.

The angled tool head assembly 008 may be specifically designed to receive and support the multi-part clip device in proper orientation for installation. The angle of the head assembly may be optimized to align the device with the aluminum framing channel during use. The clip device retainer 009 may securely cradle the multi-part clip device, preventing premature dislodgement and ensuring proper positioning during the installation process.

As shown in an embodiment in FIG. 7, the multi-part clip device retention walls 010 may provide lateral support and stability during clip device installation. These walls may be configured to accommodate a range of clip device sizes and are designed to prevent lateral shifting during the installation process. The multi-part clip device retention channel 011, positioned between the retention walls, may be dimensioned to accept standard clip device profiles while still allowing for smooth insertion and removal.

In some cases, the installation tool may be compatible with both variations of the multi-part clip device described earlier. Specifically, it may be designed to interface with clips featuring the installation slot 007, allowing for secure engagement during the installation process. The multi-part clip device retention stop 012 may function to position and constrain the clip device within the tool, ensuring proper alignment prior to insertion into the framing channel.

The multi-part clip device installation tool body 013 may be engineered for optimal balance, control, and ease of use during installation. In certain embodiments, the tool body 013 may incorporate attachment features to accommodate extension poles or auxiliary handles, thereby increasing the operator's reach and enhancing versatility in various installation environments, including elevated or hard-to-access framing segments.

The multi-part clip device system may operate in conjunction with an installation tool to provide a secure and efficient method for hanging objects within screen enclosures. In some use cases, installation begins by the user attaching the installation tool to a telescoping extension pole. This configuration may allow users to access elevated or otherwise difficult-to-reach sections of the aluminum framing within the enclosure without the need for ladders or scaffolding.

Referring to FIG. 6, the user may position a clip device into the angled tool head assembly 008 of the installation tool. The multi-part clip device retainer 009 may provide a secure hold, keeping the clip in place during the handling and positioning process. One or more multi-part clip device retention walls 010 may offer lateral support, limiting unwanted side-to-side movement, while the multi-part clip device retention channel 011 guides and aligns the clip for accurate placement.

With the clip device secured in the angled tool head assembly 008, the user may bring the tool into proximity with the desired aluminum framing channel. The angled geometry of the tool head may be specifically designed to align the multi-part clip device with the inner surfaces of the channel at an optimal insertion angle. This design helps ensure proper engagement of the spring tensioner curve and retention braces with the framing structure.

As shown in FIG. 1, the retention brace 001 of the multi-part clip device may be inserted into the framing channel. The spring tensioner curve 002 may compress slightly during insertion, creating tension that helps secure the multi-part clip device in place. The slide top limiter 003 may prevent the multi-part clip device from sliding down slanted framing by resting against protruding screws in the frame.

In some cases, the user may apply gentle pressure to the multi-part clip device installation tool body 013, pushing the multi-part clip device fully into the framing channel, the multi-part clip device retention stop 012 may ensure that the multi-part clip device is inserted to the correct depth.

Once the multi-part clip device is properly positioned and secured within the framing structure, the user may gently disengage the installation tool, leaving the clip installed in place. The component body 004 serves as a stable structural base for supporting hanging objects within the enclosure.

In certain embodiments, the multi-part clip device may include an installation slot 007, which is configured to interface with the clip device retainer 009 of the installation tool. Although not labeled in FIG. 14A, the installation slot 007 is visible in FIGS. 1A-4A, where it wraps partially around the retainer 009. This feature provides an additional engagement point, helping to stabilize the clip device during the installation process by securing it to the angled tool head assembly 008 and ensuring proper alignment with the structural channel.

To hang an object, the user may insert the item into the space defined between the object retainer 006 and the object retainer spring 005. The curved geometry and spring tension of the object retainer spring 005 apply a resilient holding force that secures the inserted object without additional fasteners.

To remove the multi-part clip device, the user may reverse the installation process. The installation tool is positioned to engage the installed clip, aligning the multi-part clip device retainer 009 with the body of the clip. By applying gentle forward pressure to re-engage the clip and then pulling the tool away from the framing, the user may extract the device from the channel in a controlled manner.

The multi-part clip device retention channel 011 of the installation tool may be dimensioned to accommodate multiple clip sizes or design variants, allowing the tool to be used flexibly across different mounting configurations and object-hanging needs within the screen enclosure.

Referring to FIG. 1A, the multi-part clip device may comprise multiple components arranged in a specific configuration. The retention brace 001 may be positioned at both longitudinal ends of the assembly, providing symmetrical support structures that resist displacement. Spring tensioner curves 002 may extend from each retention brace 001, contributing to the device's elastic engagement within a framing channel. The component body 004 may form the primary structure of the device, linking the opposing elements and supporting mechanical connection points. A clip retention slot 019 may be integrated into the component body 004 to allow insertion of a mating clip retention post 020 (shown in later figures). An installation slot 007 may also be present, which is configured to interface with an installation tool for guided placement.

FIG. 2A illustrates an isometric view of the multi-part clip device, showing its three-dimensional configuration. The retention braces 001 are shown at each end, with spring tensioner curves 002 arching inward from those points. The component body 004 spans the center and supports the internal structure, including the clip retention slot 019 and installation slot 007 (although not always visible in this view). This view emphasizes how the curved and straight elements integrate to provide a flexible but secure device suitable for aluminum framing.

FIG. 6 depicts an orthogonal side view of the installation tool. The angled tool head assembly 008 extends outward at an angle from the main body, with the multi-part clip device retainer 009 located at its end, the multi-part clip device retention wall 010 and clip device retention stop 012 are positioned to guide and secure the multi-part clip device during installation, the multi-part clip device installation tool body 013 forms the main vertical structure. This angled design may allow for easier access to framing channels, especially in tight or hard-to-reach areas of screen enclosures.

FIG. 7 provides an isometric view of the installation tool, showing the spatial arrangement of its components. The angled tool head assembly 008 includes the multi-part clip device retainer 009, clip device retention walls 010, clip device retention channel 011, and clip device retention stop 012. This configuration may offer precise control during clip device installation, potentially reducing the risk of misalignment or damage to the framing or clip.

FIG. 8 presents a top orthogonal view of the installation tool assembly. The circular base structure of the angled tool head assembly 008 contains the multi-part clip device retainer 009, clip device retention walls 010, clip device retention channel 011, and clip device retention stop 012. This top-down view may help users understand the tool's orientation and functionality, potentially improving ease of use and installation accuracy.

FIG. 9 illustrates an orthogonal side view of the installation tool assembly. The angled tool head assembly 008 connects to the multi-part clip device installation tool body 013, with the multi-part clip device retainer 009 extending from the top and clip device retention walls 010 on the sides. This side view may demonstrate the tool's ergonomic design, potentially enhancing user comfort during extended installation sessions.

FIG. 10 shows an isometric view of the complete installation tool assembly. The angled tool head assembly 008 integrates the multi-part clip device retainer 009, clip device retention walls 010, clip device retention channel 011, and clip device retention stop 012. the multi-part clip device installation tool body 013 extends downward, providing a grip area. This comprehensive view may illustrate how all components work together, potentially aiding in user understanding and efficient operation of the tool.

FIG. 17A illustrates a cross-sectional view of a typical application of the multi-part clip device within an aluminum framing structure of a screen enclosure. The aluminum framing 018 may comprise a hollow rectangular profile with parallel channels 017 running along its length. These channels 017 may serve multiple purposes, including providing structural integrity to the framing and offering attachment points for various components.

In this figure, a fastener 016, such as a screw or bolt, may be shown penetrating the upper surface of the aluminum framing. This fastener may secure the framing to other structural elements of the screen enclosure or attach additional components to the framing itself.

The parallel channels 017 within the aluminum framing may be depicted as recessed areas along the inner surfaces of the framing. These channels 017 may vary in width and depth depending on the specific framing design, but they typically run the entire length of the framing element.

The multi-part clip device may be shown inserted into one of these parallel channels 017. The retention brace of the device may engage with the edges of the channel, providing a secure grip. The spring tensioner 002 may be depicted in a compressed state, exerting force against the inner surfaces of the channel to maintain the device's position.

The component body 004 of the multi-part clip device may extend through the channel 017, with the object retainer spring 005 and object retainer 006 positioned below the framing. This configuration may allow for objects to be hung from the device while maintaining a low profile within the framing structure.

The slide stop limiter 003 of the multi-part clip device may be shown resting against the upper edge of the channel 017 or in contact with the fastener 016. This interaction may prevent the multi-part clip device from sliding downward within the channel 017, especially in applications where the framing is oriented vertically or at an angle.

The figure may also depict how the multi-part clip device adapts to the specific dimensions of the framing channel 017. The spring tensioner may compress to different degrees based on the channel width, potentially demonstrating the device's versatility across various framing profiles.

In some cases, multiple clip devices inserted into different channels 017 of the same framing 018 allows for hanging and securing multiple objects along the length of the framing 018.

Referring to FIG. 18, the multi-part clip device is shown in a pre-installation orientation, aligned with but not yet fully inserted into the channel 017 of the aluminum framing structure 018. In this view, the retention braces 001 and spring tensioner curves 002 are positioned to slide into the channel opening, while the component body 004 remains below the framing. The slide top limiter 003 is positioned just below the outer lip of the framing, indicating its future role as a stop once the device is fully installed. This view illustrates the alignment and angular entry required for insertion, suggesting that upward pressure would seat the component body 004 into the channel while the spring tensioner 002 compresses temporarily to allow passage. The object retainer 006 and object retainer spring 005 are visible below the framing channel, poised to receive hanging objects once installation is complete.

Following insertion, as illustrated more clearly in FIG. 19, the spring tensioner curve 002 would press outward against the interior sidewalls of the channel 017, anchoring the multi-part clip device in place. The retention brace 001 engages the channel edges to resist both lateral and vertical displacement. Meanwhile, the slide top limiter 003 may rest against a structural fastener (not shown) or the upper channel edge to prevent downward drift, especially in vertical or angled framing applications. FIG. 19 also emphasizes how the clip's geometry adapts to standard aluminum framing profiles, leveraging elastic deformation and mechanical interference to achieve a stable, tool-assisted installation.

Referring to FIG. 20, a plurality of multi-part clip devices may be shown fully inserted into parallel channels 017 of an aluminum framing structure 018 typical of screen enclosures. In this installed configuration, each clip device is securely seated within its respective channel. The retention braces 001 and spring tensioner curves 002 are compressed against the internal walls of the framing channels, providing outward force and mechanical engagement. The component bodies 004 align vertically, while the object retainers 006 project downward, allowing the system to support external objects below the frame. This figure demonstrates how multiple clip devices may be used simultaneously along the same framing member to create a stable, distributed load-bearing arrangement.

As illustrated in FIG. 21, the multi-part clip devices may be used to support a hanging fixture, such as a lighting element, suspended plant holder, or decorative item. The fixture may be coupled to the object retainers 006 of the installed clip devices, allowing the structure to bear the object's weight through spring tension and mechanical engagement. This arrangement may be particularly advantageous in aluminum-framed screen enclosures, where traditional fasteners are not desirable or feasible. The use of multiple clip devices provides enhanced load distribution, reduces stress on individual framing points, and allows for non-invasive, reversible installation of objects without modifying or damaging the framing system.

Those skilled in the art to which this application relates will appreciate that other and further additions, deletions, substitutions and modifications may be made to the described embodiments.

Those skilled in the art will appreciate the multiple ways the multi-part clip device can be manufactured using 3D printing technology for creating single or customized instances. Materials such as ABS, PLA, PETG, or nylon are recommended for their balance of durability, flexibility, and lightweight properties. The 3D printer can be configured to print components in a layer-by-layer process with high precision, ensuring intricate features like the retention braces, spring tensioner curves, and installation slot are accurately formed. This method allows for rapid prototyping and enables adjustments to the design to accommodate specific framing profiles or aesthetic preferences. Each piece can be printed as an independent unit, ready for direct use or minor post-processing, such as smoothing or trimming.

Furthermore, those skilled in the art will appreciate large-scale production of the multi-part clip device, and recognized injection molding is a method. This process involves creating steel or aluminum molds that define the shape and features of each component. The molds are designed to replicate the detailed elements of the devices, such as the angled tool head assembly and clip retention channel, ensuring consistency across high volumes. The molds are precision-machined based on CAD models of the devices. Materials such as polypropylene, polycarbonate, or ABS are melted and injected into the molds under high pressure. These materials offer excellent strength, weather resistance, and the flexibility required for the spring tensioner curves and object retainers. The injection molding process includes a cycle of injecting, cooling, and ejecting the parts. Multiple molds can be used in parallel to increase production speed. Advanced cooling systems ensure rapid solidification of the plastic, reducing production times while maintaining high quality. After ejection, the parts may undergo minor finishing processes like trimming of excess material (flash) or surface treatments for aesthetic enhancements, such as texturing or color application.

Furthermore, those skilled in the art will appreciate that once manufactured, the multi-part clip devices and installation tools can be packaged in different quantities, tailored to customer needs. For small retail sales, individual clip devices or installation tools can be sealed in clear plastic bags with instructions and branding. These are ideal for DIY enthusiasts or homeowners needing only a few units. Larger quantities, such as 25, 50, or 100 units, can be packaged in durable cardboard boxes with internal dividers to prevent damage during transport. Each box may include a single installation tool for convenience. For a unique packaging approach, the multi-part clip devices can be molded as interconnected pieces on a single plastic sprue, similar to hobbyist model kits. This presentation reduces packaging volume and allows end-users to detach the parts as needed. Such packaging appeals to DIY customers and emphasizes the modular nature of the product.

The specification is not to be taken in a limiting sense but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the description to provide a thorough understanding of the invention.

These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specifications, and are to be considered a portion of the entire written description of this invention. As used in the preceding description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly", and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

What is claimed is:

1. A multi-part clip device for hanging objects within screen enclosures and other aluminum-framed structures, comprising:

a component body configured to engage with a structural channel of an aluminum framing structure;

wherein the component body includes a spring tensioner curve having a defined radius, the spring tensioner curve configured to elastically deform during installation and to apply an outward force against opposing inner walls of the structural channel to secure the clip device in a retained position;

at least one retention brace extending from the component body and configured to engage with the structural channel to limit lateral or vertical displacement;

an object retainer configured to mechanically couple to the component body via an insertable retention post and slot interface to retain a hanging object;

wherein the object retainer includes an object retainer spring having a defined radius configured to elastically deform during insertion of a hanging object and apply a holding force that retains the object in place; and wherein the object retainer is reversibly insertable into the component body in at least two orientations and is held in position by mechanical fit or spring tension between the object retainer and the component body.

2. The multi-part clip device of claim 1, further comprising a slide top limiter connected to the object retainer and configured to restrict vertical movement of the multi-part clip device once installed in the structural channel.

3. The multi-part clip device of claim 1, wherein the object retainer spring and object retainer body are oriented parallel to a longitudinal axis of the component body.

4. The multi-part clip device of claim 1, wherein the object retainer spring and object retainer body are oriented perpendicular to a longitudinal axis of the component body.

5. The multi-part clip device of claim 1, wherein the object retainer is rotationally reconfigurable between at least two angular orientations relative to the component body to provide adjustable hanging orientations for objects within the enclosure.

6. The multi-part clip device of claim 1, further comprising an installation slot formed in the component body, the installation slot configured to interface with an installation tool.

7. The multi-part clip device of claim 1, wherein the multi-part clip device is constructed from a thermoplastic or polymeric material selected from the group consisting of polypropylene, high density polyethylene, polystyrene, polyethylene, high impact polystyrene, polyvinyl chloride, acrylic, acrylonitrile butadiene styrene, polycarbonate, nylon, polyurethane, polyetherimide, polyether ether ketone, and polyphenylene sulfide.

8. The multi-part clip device of claim 1, wherein the at least one retention brace comprises two retention braces positioned at opposite ends of the component body.

9. The multi-part clip device of claim 1, wherein each of the two retention braces includes a spring tensioner extending therefrom.

10. The multi-part clip device of claim 1, wherein the object retainer includes a load-bearing ridge to support weighted objects exceeding 1.5 pounds.

11. An installation system for mounting objects within screen enclosures, comprising:

a component body configured to engage with a structural channel of an aluminum framing structure;

wherein the component body includes a spring tensioner curve having a defined radius, the spring tensioner curve configured to elastically deform during installation and to apply an outward force against opposing inner walls of the structural channel to secure the clip device in a retained position;

at least one retention brace extending from the component body and configured to engage with the structural channel to limit lateral or vertical displacement;

an object retainer configured to mechanically couple to the component body via an insertable retention post and slot interface to retain a hanging object;

wherein the object retainer includes an object retainer spring having a defined radius configured to elastically deform during insertion of a hanging object and apply a holding force that retains the object in place; and wherein the object retainer is reversibly insertable into the component body in at least two orientations and is held in position by mechanical fit or spring tension between the object retainer and the component body;

an installation tool comprising:

an angled tool head assembly;

a clip retainer connected to the angled tool head assembly and configured to engage with the multi-part clip device; and a clip installation tool body configured to attach to an extension pole.

12. The installation system of claim 11, wherein the installation tool further comprises:

at least one clip retention wall connected to the angled tool head assembly;

a clip retention channel formed between the at least one clip retention wall; and a clip retention stop positioned at an end of the clip retention channel.

13. The installation system of claim 11, further comprising a clip retention stop positioned at an end of the clip retention channel and configured to limit movement of the multi-part clip device during installation.

14. The installation system of claim 11, wherein the clip retainer is configured to engage with an installation slot of the multi-part clip device.

15. The installation system of claim 11, wherein the clip installation tool body is configured to attach to a telescoping extension pole.

16. The installation system of claim 11, wherein the angled tool head assembly is oriented at an angle between 30 and 60 degrees relative to the clip installation tool body.

17. The installation system of claim 11, wherein the installation tool includes a user-operable handle portion spaced from the angled tool head by at least 24 inches.

* * * * *